(12) United States Patent
Johansson et al.

(10) Patent No.: US 11,641,288 B2
(45) Date of Patent: May 2, 2023

(54) LOW LATENCY SMALL MESSAGE COMMUNICATION CHANNEL USING REMOTE WRITE

(71) Applicant: Telefonaktiebolaget LM Ericsson (publ), Stockholm (SE)

(72) Inventors: Leif Johansson, Stockholm (SE); Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/753,878

(22) PCT Filed: Sep. 19, 2019

(86) PCT No.: PCT/SE2019/050885
§ 371 (c)(1),
(2) Date: Mar. 16, 2022

(87) PCT Pub. No.: WO2021/054874
PCT Pub. Date: Mar. 25, 2021

(65) Prior Publication Data
US 2022/0417055 A1    Dec. 29, 2022

(51) Int. Cl.
*H04L 29/06* (2006.01)
*H04L 12/40* (2006.01)
*H04L 12/64* (2006.01)
*H04L 25/02* (2006.01)
*H04L 43/20* (2022.01)
(Continued)

(52) U.S. Cl.
CPC .. *H04L 12/40013* (2013.01); *H04L 12/40019* (2013.01); *H04L 43/20* (2022.05); *H04L 49/901* (2013.01); *H04L 49/9026* (2013.01)

(58) Field of Classification Search
USPC ........................................................ 709/212
See application file for complete search history.

(56) References Cited

U.S. PATENT DOCUMENTS 9,742,471 B1 * 8/2017 Thoen ................. H04B 5/0031
2008/0211915 A1 * 9/2008 McCubbrey ..... G08B 13/19608
348/E7.086
(Continued)

FOREIGN PATENT DOCUMENTS

WO        2018130883 A1    7/2018

OTHER PUBLICATIONS

International Search Report and Written Opinion for Application No. PCT/SE2019/050885, dated Feb. 20, 2020, 10 pages.
(Continued)

*Primary Examiner* — Jude Jean Gilles
(74) *Attorney, Agent, or Firm* — Nicholson De Vos Webster & Elliott LLP

(57) ABSTRACT

A method implemented by an electronic device for sending data on low latency communication includes remote writing a sequence number of a message to be sent next to a receiver, determining whether there is an open position in a receive buffer of the receiver using a local tracking mechanism, writing data of the message to an area of an address space of a sending application that is mapped onto the receive buffer as a result of determining there is the open position in the receive buffer, incrementing a local sequence counter, and updating position information in the local tracking mechanism.

20 Claims, 26 Drawing Sheets

(51) Int. Cl.
H04L 49/901 (2022.01)
H04L 49/90 (2022.01)
*G06F 15/16* (2006.01)
*G06F 3/06* (2006.01)

(56) References Cited

U.S. PATENT DOCUMENTS

| | | | |
|---|---|---|---|
| 2009/0022245 A1* | 1/2009 | Binkley | H04L 27/3818 |
| | | | 375/319 |
| 2009/0126774 A1* | 5/2009 | Taylor, II | G05D 3/105 |
| | | | 136/244 |
| 2018/0020054 A1* | 1/2018 | Woodacre | H04L 67/1097 |
| 2020/0204527 A1* | 6/2020 | Vass | G06Q 10/107 |

OTHER PUBLICATIONS

W. Eddy, "Transmission Control Protocol Specification draft-ietf-tcpm-rfc793bis-14," Jul. 30, 2019, 104 pages, IETF Trust and the persons identified as the document authors.
Hankook Jang et al., "Implementation of an Efficient RDMA Mechanism Tightly Coupled with a TCP/IP Offload Engine," 2008, pp. 82-88, IEEE.
"Transmission Control Protocol—Wikipedia," Nov. 28, 2017, 13 pages, downloaded from https://en.wikipedia.org/w/index.php?title=Transmission_Control_Protocol&oldid=812597098 on Mar. 16, 2022.
Yong Wan et al., "An In-depth Analysis of TCP and RDMA Performance on Modem Server Platform," 2012, pp. 164-171, 2012 IEEE Seventh International Conference on Networking, Architecture, and Storage.

\* cited by examiner

Write to memory

| Write Addr. | | | | | |
|---|---|---|---|---|---|
| 100 | 1 | Mem[100] | 0 | 0 | |
| 108 | 1 | Mem[108] | 0 | 0 | |
| 116 | 1 | Mem[116] | 0 | 0 | |
| 124 | 1 | Mem[124] | 0 | 0 | |

Need to initiate 4 separate writes to memory

Store Buffer to combine neighbor addresses

| Write Addr. | | | | | |
|---|---|---|---|---|---|
| 100 | 1 | Mem[100] | 1 | Mem[108] | 1 | Mem[116] | 1 | Mem[124] |
| | 0 | | 0 | | 0 | | 0 | |
| | 0 | | 0 | | 0 | | 0 | |
| | 0 | | 0 | | 0 | | 0 | |

Single write to memory

FIG. 3

LOW LATENCY SMALL MESSAGE COMMUNICATION CHANNEL USING REMOTE WRITE

CROSS-REFERENCE TO RELATED APPLICATIONS

This application is a National stage of International Application No. PCT/SE2019/050885, filed Sep. 19, 2019, which is hereby incorporated by reference.

TECHNICAL FIELD

Embodiments of the invention relate to the field of low latency communication; and more specifically, to the use of remote writes to implement a low latency small message communication channel.

BACKGROUND ART

A computing system can run multiple processes that can exchange data through inter-process communication. In some cases, inter-process communication operates by using shared memory. In these cases, the processes write and read data in the shared memory location to exchange data. However, shared memory is typically only available on a single processing unit within a computing system. A processing unit, as used herein, refers to a set of processors and associated resources that communicate via an interconnect (e.g., a local bus). Large scale computing systems, such as servers, cloud systems, racks of network devices and similar computing systems, can include any number of processing units (sometimes referred to as compute blades).

While a process within a processing unit can communicate via inter-process communications that are based on shared memory, processes cannot efficiently share data between processing units via shared memory. Instead, processing units communicate via networking interfaces, for example via Ethernet network protocol. An application, which is a computer program that can be implemented by one or more processes that are executed by a processor of the processing unit, can utilize inter-process communication to share data with other applications, other instances of the application (e.g., where the application is a distributed application), or in similar configurations.

FIG. 1 is a diagram of an example communication channel between two processing units 101A and 101B. The communication channel can have any physical medium and utilize any combination of network protocols, e.g., Ethernet and transmission control protocol (TCP)/Internet Protocol (IP). Each processing unit 101A and 101B implements a network protocol handler 107A and 107B. Processes, e.g., associated with applications 105A-C on processing unit 101A can exchange data via the communication channel 103 with the applications 105D-F on processing unit 101B and vice versa. However, this type of inter-process communication involves significant overhead and latency. Implementing the network protocol handler 107A and 107B on each processing unit 101A and 101B requires significant compute resources. The use of network protocols provide great flexibility and usually high interconnect bandwidth, but the latency and performance costs are a magnitude higher than an inter-process communication using shared memory. For latency sensitive applications which need to scale beyond a processing unit, the information sharing using standard network protocols is a huge challenge in performance cost and extra latency.

SUMMARY

In one embodiment, a method is implemented by a computing device for sending data on low latency communication. The method includes remote writing a sequence number of a message to be sent next to a receiver, determining whether there is an open position in a receive buffer of the receiver using a local tracking mechanism, writing data of the message to an area of an address space of a sending application that is mapped onto the receive buffer as a result of determining there is the open position in the receive buffer, incrementing a local sequence counter, and updating position information in the local tracking mechanism.

The embodiments further include a computing device that has a non-transitory computer readable medium having stored therein a channel manager, and a processor coupled to the non-transitory computer readable medium, the processor to execute the channel manager to carry out the method steps described herein. In some embodiments the computing device is configured to execute a plurality of virtual machines, the plurality of virtual machines implementing network function virtualization (NFV). In other embodiments, the computing device is a control plane device configured to implement a control plane of a software defined networking (SDN). Additional embodiments include a machine-readable medium comprising computer program code which when executed by a computer carries out the method steps described herein.

In a further embodiment, another method is implemented by a computing device for sending data on low latency communication. The additional method includes determining whether a sequence number for messages has changed, loading a received message from a receive buffer as a result of determining the sequence number has changed, providing received message to local application, updating receive buffer position information in local tracking mechanism, and acknowledging the received message by remote write to update a tracking mechanism of a sender of the message.

The embodiments further include a computing device that has a non-transitory computer readable medium having stored therein a channel manager, and a processor coupled to the non-transitory computer readable medium, the processor to execute the channel manager to carry out the additional method steps described herein. In some embodiments the computing device is configured to execute a plurality of virtual machines, the plurality of virtual machines implementing network function virtualization (NFV). In other embodiments, the computing device is a control plane device configured to implement a control plane of a software defined networking (SDN). Additional embodiments include a machine-readable medium comprising computer program code which when executed by a computer carries out the additional method steps described herein.

BRIEF DESCRIPTION OF THE DRAWINGS

The invention may best be understood by referring to the following description and accompanying drawings that are used to illustrate embodiments of the invention. In the drawings:

FIG. 3 is a diagram of one embodiment of a store buffer for combining remote writes by the sender.

DETAILED DESCRIPTION

Figure 1:
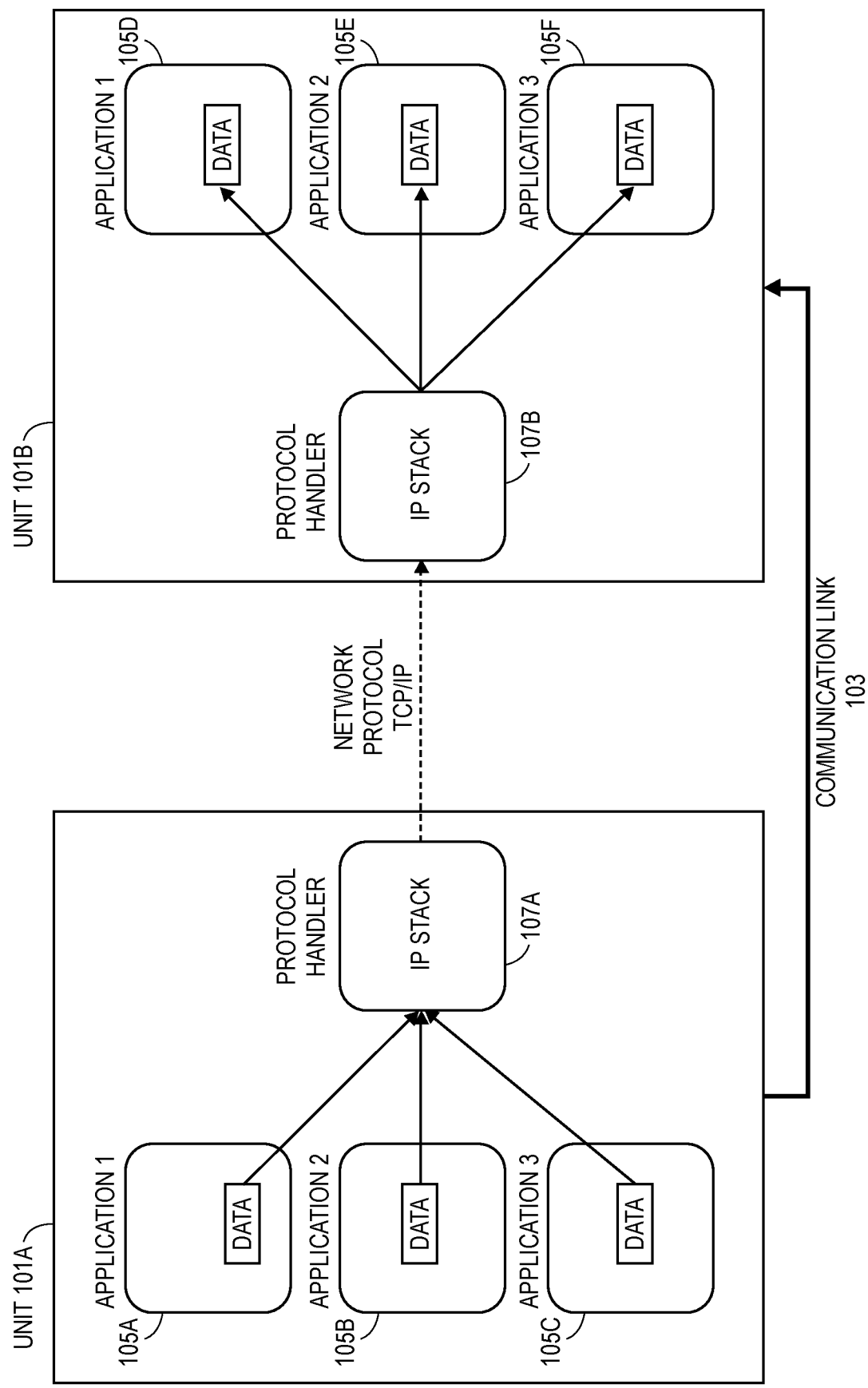
FIG. 1 is a diagram of one embodiment of a standard communication channel between processing units.

The following description describes methods and apparatus for a low latency communication channel and process using remote writes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 2:
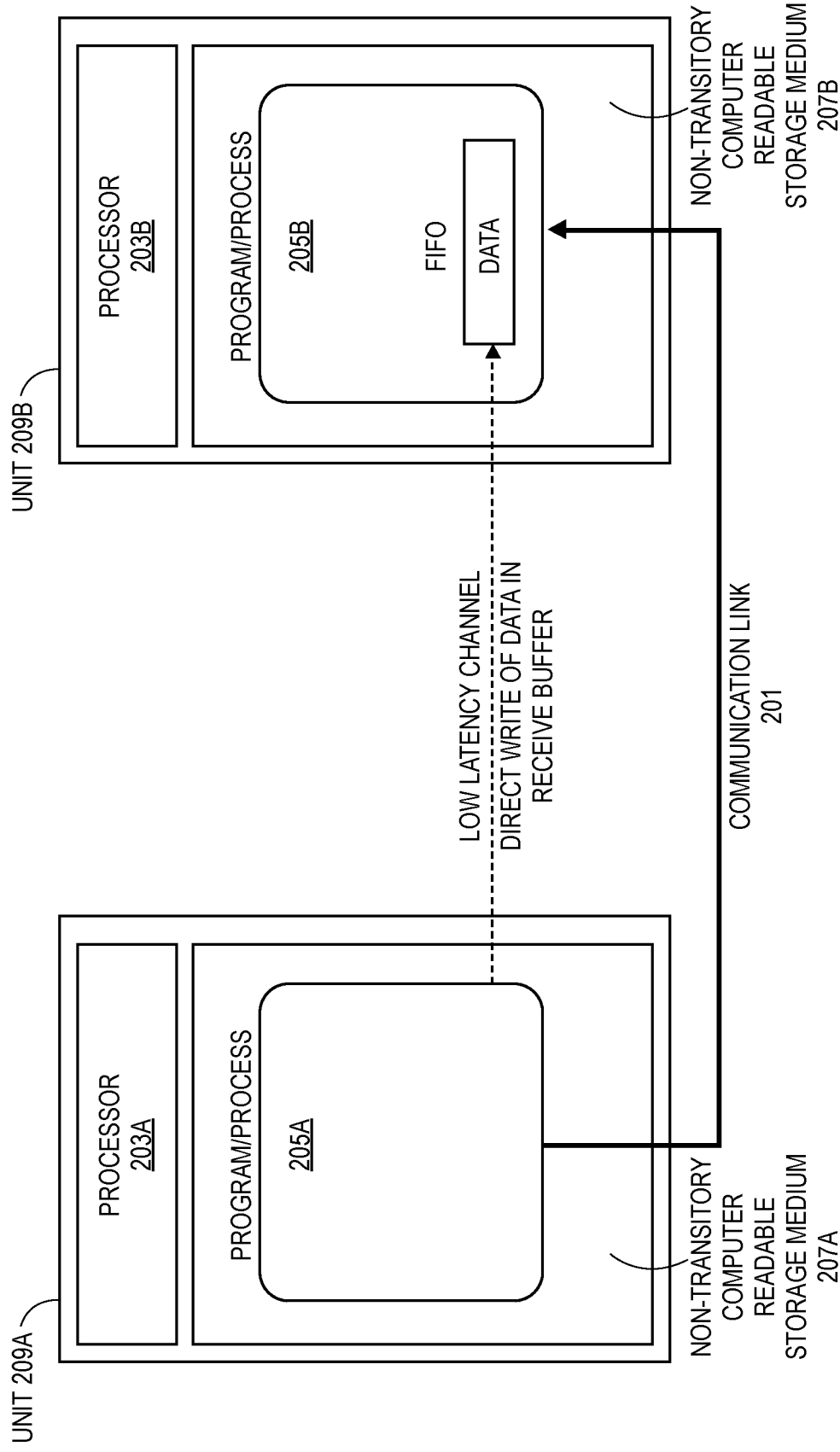
FIG. 2 is a diagram of one embodiment of a low-latency communication channel based on remote writes.

FIG. 2 is a diagram of one embodiment of a low latency communication channel. The embodiments provide a low latency communication channel that is based on the use of remote writes without the use of remote reads. In the embodiments, a 'remote write' is an operation to write or store data (e.g., via a write or store instruction) to a location that is within a virtual address space of the application performing the remote write. The remote write can be executed by a processor of the processing unit implementing the sending application. The location where the data is written is memory mapped to a location in an address space of another application that is receiving the data (e.g., in a receive buffer of the receiving application). The receiving application is executing in a separate processing unit, thus, the write of data to the receiving application is a 'remote' write. The embodiments enable use of shared memory between processing units. The embodiments can utilize technologies such as for example, peripheral component interconnect express (PCIe), PCIe non-transparent bridging (NTB), remote direct memory access (RDMA) (e.g., over Ethernet or InfiniBand) and similar technologies that provide the ability to access memory on a remote processing unit. The embodiments provide a low latency channel of communication between processing units, which use the ability to directly write to a remote unit receive buffer as illustrated in FIG. 2.

The communication channel 201 is established between an application or process 205A executed by a processor 203A in a first processing unit 209A. The processing unit 209A includes the processor 203A, non-transitory computer-readable storage medium 207A, communicatively coupled by an interconnect, along with additional components not illustrated for sake of clarity and conciseness. The processing unit 209A includes at least one physical communication channel and interface to enable the use of remote write technologies. The second processing unit 209B can have similar components and resources to execute a second application or process 205B. The second processing unit 209B includes a processor 209, non-transitory computer readable storage medium 207B, interconnect, and at least one physical communication channel and interface to enable the use of remote write technologies. Other additional components are not illustrated for sake of clarity and conciseness.

The remote memory writes allow the application/process to directly communicate via shared memory, like normal inter-process communication within a processing unit. Please note that the remote memory is not typical application memory with cache coherence. To achieve the performance and reduced latency, the embodiments take into consideration the characteristics of the remote memory. The second process includes and defines a receive buffer, which can function as a first in first out (FIFO) or similar buffer. The receive buffer is specific to the application or process; during communication channel establishment, the location of the receive buffer is made known to the other applications or processes 205A.

To avoid complex memory implementation and provide fault isolation, the remote processing unit's memory can be mapped as non-cacheable by the sending processing unit. How efficiently an application or process can use the remote memory depends on the latency of the communication channel and how much data the application or process can send in each remote write. To use the remote memory efficiently, the application or process can send large data chunks for each write operation.

FIG. 3 is a diagram of one embodiment of a process for a combined remote write. A processing unit that is performing a remote write can utilize a store buffer to organize a combined remote write. Each processing unit connected via a low latency communication channel can have a store buffer and perform combined remote writes into the receive buffer of the other processing unit. The combined remote write is a discrete memory write that combines multiple separate writes into one single remote write. In one example embodiment, to speed up the remote writes, the receive buffer memory can be marked as a write combined memory area (i.e. a memory area that can receive combined writes). The receive buffer memory is a noncacheable memory and can be allocated as write combined at the sending machine. The receive buffer memory in the receiving machine is a cacheable memory. This allows the sending processing unit to combine write operations in the store buffer, as illustrated in FIG. 3, before performing a write to the receive buffer, such that a set of accumulated data in the store buffer can be written together in a single remote write over the low latency communication channel to the receive buffer. In cases where the combined write is activated or implemented, a write to memory that is designated as write combined memory area is delayed until either the store buffer is full, where the communication channel is used as efficiently as possible, or where a write combine timer expires. After the data in the store buffer is written, then the application or process flushes the memory reserved for the store buffer. For example, the flush can be implemented in an X86 architecture by executing sfence instructions.

The illustrated example shows that without a combined write, a process to write four blocks of data to address 100-124 would utilize four writes to four separate memory locations in the top portion of the diagram. In the example, each horizontal line represents a time period of a potential write and each right-hand column represents a block of data that can be written in this time period. The bottom portion of the diagram illustrates that writes to adjacent addresses 100-124 can be buffered and performed as a single write to the initial address (e.g., address 100) with the same data set.

The use of the combined write and store buffer enables efficient writes to the remote memory over the communication channel, but can cause the write to be delayed. To reduce the write latency, the process can utilize a timeout to limit the wait time. In an example implementation, the process can issue an sfence instruction to force a write (i.e., a flush) of the data in the store buffer, though this can have the consequence of reduced communication channel utilization. The write combination is therefore a balance between communication channel bandwidth utilization and latency when performing remote writes. If the bandwidth utilization and latency is configured in a balanced way, the processes can share information between processing units a magnitude of order faster than a standard network protocol.

While remote writes are efficient, low latency, and can be further improved in this regard as combined writes, on the other hand, remote reads do not have similar characteristics. Remote reads based on the same technologies providing support for the remote writes are not comparatively efficient memory operations. When implementing a standard FIFO receive queue using remote memory, remote memory reads must be avoided due to the poor performance and latency of the remote reads. Using remote reads over the communication channel will reduce overall communication channel bandwidth utilization and increase latency.

The embodiments therefore do not utilize remote reads. Instead, the embodiments utilize the remote writes and replicated communication channel status on each end of the communication channel. In some embodiments, the remote write uses a reliable communication channel where memory operations are either successful or immediate notification of fault on the remote write is provided. This means that the application or process utilizing the communication channel does not need to supervise the remote write. In example embodiments, both PCIe (NTB) and RDMA provide a reliable communication channel that can be utilized over various types of communication links. However, the remote writes can also be implemented over unreliable communication channels with processes to compensate for loss or failure. Further, RDMA and NTB also provide fault isolation. A remote processing unit connected via NTB/RDMA can restart or fail without impacting other processing units.

The embodiments provide a process for small message communication based on remote writes optimized for lowest possible latency while providing real time guarantees. The embodiments can be utilized for inter-process communication within a distributed application, in a cloud system, in a computer cluster, or in similar computing environments. The embodiments overcome issues with previous technologies. The low latency small message communication system and process of the embodiments provides lower latency and better bandwidth utilization than conventional network protocols. Network protocols are designed for connecting a large number of computing devices, to provide connectivity over large distances, to provide high interconnect bandwidth for large messages, and to provide fault isolation, where a remote computing system can restart without impacting other computing systems communicating with the network protocol.

However, using a conventional network protocol is a challenge when an application requires low latency information sharing between processes. The major challenges for using conventional network protocols include that the network protocol overhead is high. Though efficient for sending large messages, there is a high risk that the network protocol handling of the message costs more than the direct application handling of the message. Conventional network protocols are not designed for low latency. The latency of network protocols is also not deterministic and typically magnitudes of order higher than the process information sharing latency within a processing unit. As a result, there is a high risk that an application that is sensitive to latency is not able to respond in time when using a network protocol. Network protocols have limited scalability in certain cases. A network protocol handler needs to distribute/send the messages to/from application/processes within a processing unit. There is a high risk that the network protocol handler is going to be the limiting factor in these exchanges. It is tricky to load distribute/regulate the information sent to the remote processing unit. For example, a congested queue could be caused by the network protocol handler instead of the application on the receiving target computing system. With network protocols, there may be packet drops, because the media can silently drop packages. The network protocol on top of the media or application must support reliable interconnect, which complicates the design of the network protocol.

The alternatives to conventional network protocols are the use of direct write to remote processing unit receive buffers using remote writes. This can be achieved using RDMA/PCIe (NTB). The remote write enables the sending unit to directly communicate to the receiving processing unit application without involving a network protocol handler. Remote writes are configured to target low latency on a communication channel. The remote write can be utilized with write combining to target high bandwidth on the communication channel. The remote writes are paired with inefficient remote reads that must be avoided when implementing a remote FIFO receive buffer.

The embodiments address the general problems that all prior solutions suffered from. The embodiments reduce latency by avoiding application polling the send and receive buffers in a busy loop. The embodiments improve power saving by reducing network protocol overhead and latency. Further, the embodiments provide more measurable load management and perform load regulation.

The embodiments overcome the limitations of the prior art by providing a process and system for information sharing between applications/processes on different processing units through remote writes into an application-provided receive buffer over a communication channel. The communication channel between the processing units can be based upon reliable communication transfer technologies such as PCIe and RDMA. The communication channel of the embodiments provides fault isolation, if a unit fails/restarts other processing units connected via the reliable communication channel are not affected, and guaranteed ordering, such that memory operations on the communication channel are transferred in order.

The embodiments utilize a receive buffer that can be implemented as a FIFO queue with a single sender and a single receiver. No memory locks are needed when inserting/fetching a message in the receiving buffer. Further, the receive buffer is implemented as shared memory on the receiving unit. This means that all application/processes can access the receive buffer using normal memory operation on the receiving unit. The embodiments utilize remote memory writes into the receive buffer of an application, which provides a scalable solution where all applications and processes on the sending processing unit can directly send data to all applications and processes on the remote processing unit. There is no need for a separate central instance of a process to distribute the messages on the receiving processing unit. The embodiments enable all applications in a processing unit to set up direct communication channels to application in a remote processing unit and send data independently of other communication channels, e.g., without requiring synchronizations for managing shared execution resources or shared memory resources. The embodiments provide a process and system where the latency on the communication channel is reduced by flushing the store buffer after the message including the header has been written to the receive buffer. In some embodiments, a timer for the communication channel for each message or burst of messages can be used to trigger the flush of the store buffer where it is determined that the increased latency would not negatively impact operation. In some embodiments, the flush of the store buffer is done using an sfence instruction, e.g., when using NTB as a communication channel. The embodiments can be combined with the low latency activation vectors, which enable the receiving processing unit to get a hint as to which queue to poll for incoming data and to perform efficient power management.

The embodiments provide many advantages; all together they can enable supporting new classes of applications in cloud system computing environments. The embodiments reduce overhead and communicate directly between applications and processes on separate processing units making it possible to also bypass significant system complexity and major causes for latency. Variations and optimization of the embodiments can provide better control to meet real time constraints within complex deployments such as, for example, cloud system computing environment.

Additional advantages include minimal latency, because communication is performed with minimal latency using remote write operations (e.g., the embodiments inherit performance advantages from the reduction of overhead of standard network messaging protocols, and use mechanisms that bypass the operating system and hypervisor). The embodiments provide a process and system where latency is significantly lower than prior art including those based on RDMA. The embodiments of the low latency communication channel and process is designed to handle small messages (e.g., 64 byte messages). The low latency communication channel and process enables hard real time guarantees, and is highly scalable. All communication is done without any shared or serialized protocol execution that can become a bottleneck. All applications or processes can directly communicate with any application/process on the remote unit. All communication can be done independent of other messaging using the same process (e.g., each communication channel and the messaging for each communication channel are independent), no lock mechanisms are needed when sending/receiving a message.

The embodiments can be combined with the use of activation vectors to hint which queues to poll and provide efficient power management. The embodiments of the low latency communication channel that utilize activation vectors do not need to run in a busy loop, which enables better hyper thread performance and processor power usage. The activation vectors can be implemented in combination with hardware support. The embodiments have efficient FIFO queue implementation using non-coherent/non-cacheable remote memory and provide a good balance between low deterministic communication latency and communication bandwidth. The embodiments provide a simpler design relative to existing technologies, the communication channel is reliable and memory operations fail immediately when the communication channel is down. There is no need to supervise remote writes by the associated processes and applications. Thus, the embodiments provide fast fault detection.

The embodiments provide an easy mechanism to load regulate, where the sender receives an immediate response indicating a congested remote receive buffer for an application. It is also possible to monitor load; a hardware performance counter can be used to measure the amount of time that an associated application is running in an active mode. This can be useful when performing load regulation or managing back pressure. The embodiments of the low latency communication channel and process have a lower cost and are power efficient when using PCI based communication (NTB). There is no need for additional network cards or similar components for a processing unit to implement the embodiments. NTB support is integrated in the processor of the processing unit.

The embodiments also have application in cloud computing systems. In cloud systems, the supporting technologies such as RDMA are increasingly available. Major cloud providers are upgrading hardware to support RDMA and similar technologies. These direct memory access technologies are used internally for implementing the providers cloud services but not enabled for cloud applications. The embodiments enable the expansion of the use of these technologies to the application level by providing an inter-process communication channel.

Figure 4:
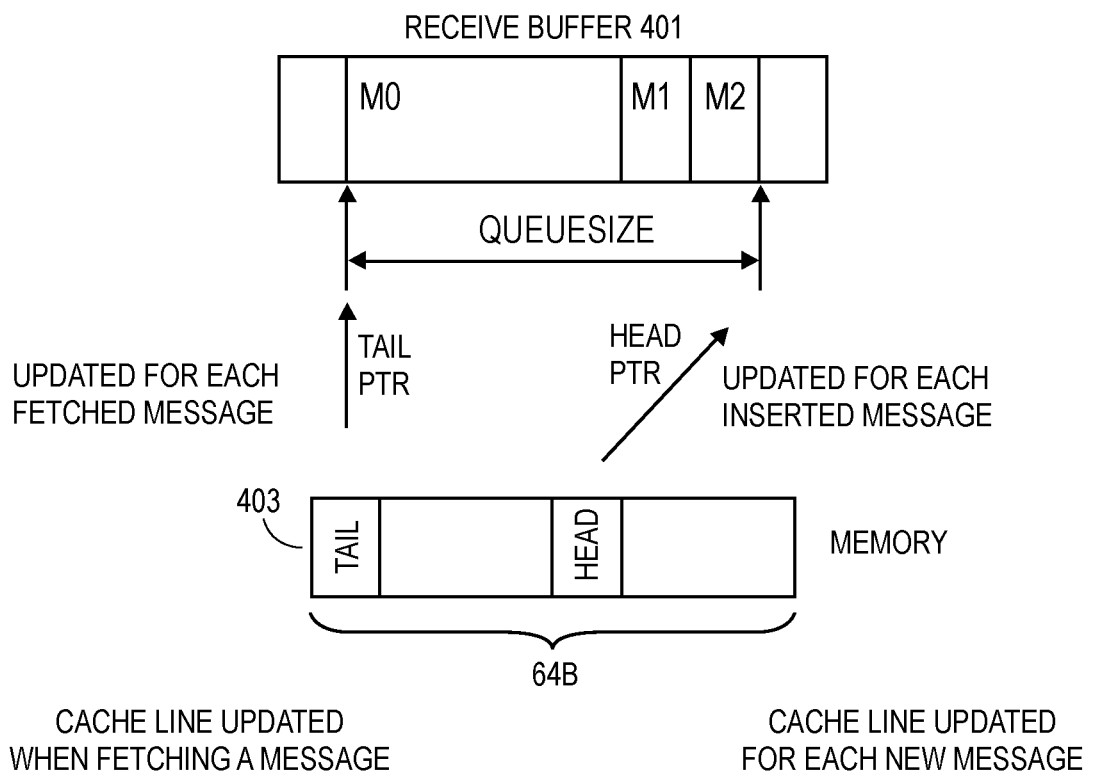
FIG. 4 is a diagram of one embodiment of a receive buffer.

FIG. 4 is a diagram of one embodiment of a receive buffer. Receive buffers are established at the processing unit by a process or application that is utilizing the communication channel. The low latency communication channel utilizes remote writes to the remote processing unit receive buffer. In one embodiment, the receive buffer is a standard FIFO queue with head and tail pointer as illustrated in FIG. 4. Both the receive buffer and the data structure tracking the head and tail pointer can be reached via remote memory operations (e.g., using RDMA/NTB). The illustrated example shows a receive buffer 401 and a tracking structure 403. The receive buffer 401 includes three messages (M0-M2) with varying message sizes. The application that fetches each received message updates the tail pointer to point to the next received message, if any. The head pointer is updated by a sending processing unit when the sending processing unit inserts a message in the receive buffer. The updating of the header and pointer utilize only local reads and writes or remote writes, a remote read is not utilized because the remote read is too slow and introduces too much latency into the use and management of the receive buffer. The tracking structure can be maintained in a single cache line or similar memory location and memory size to facilitate fast updates and accesses to the information stored therein. The example of a receive buffer being a FIFO with a head and tail pointer is provided by way of example. One skilled in the art would understand that similar data structures and tracking mechanisms could be utilized that enable the ordered processing of the messages.

Figure 5:
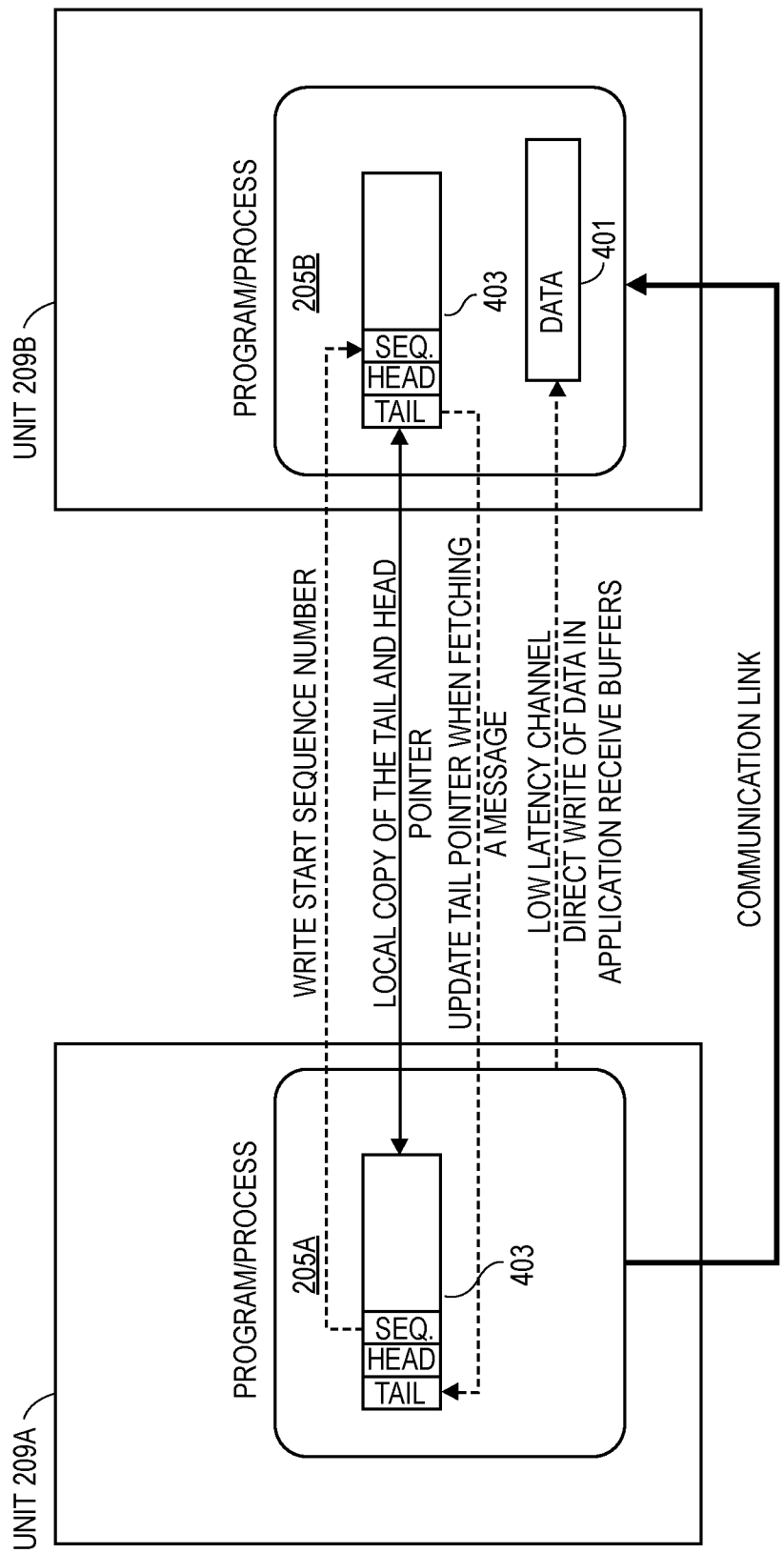
FIG. 5 is a diagram of one embodiment of a low latency communication channel operation to manage tail and head information on each end of the link.
Figure 6:
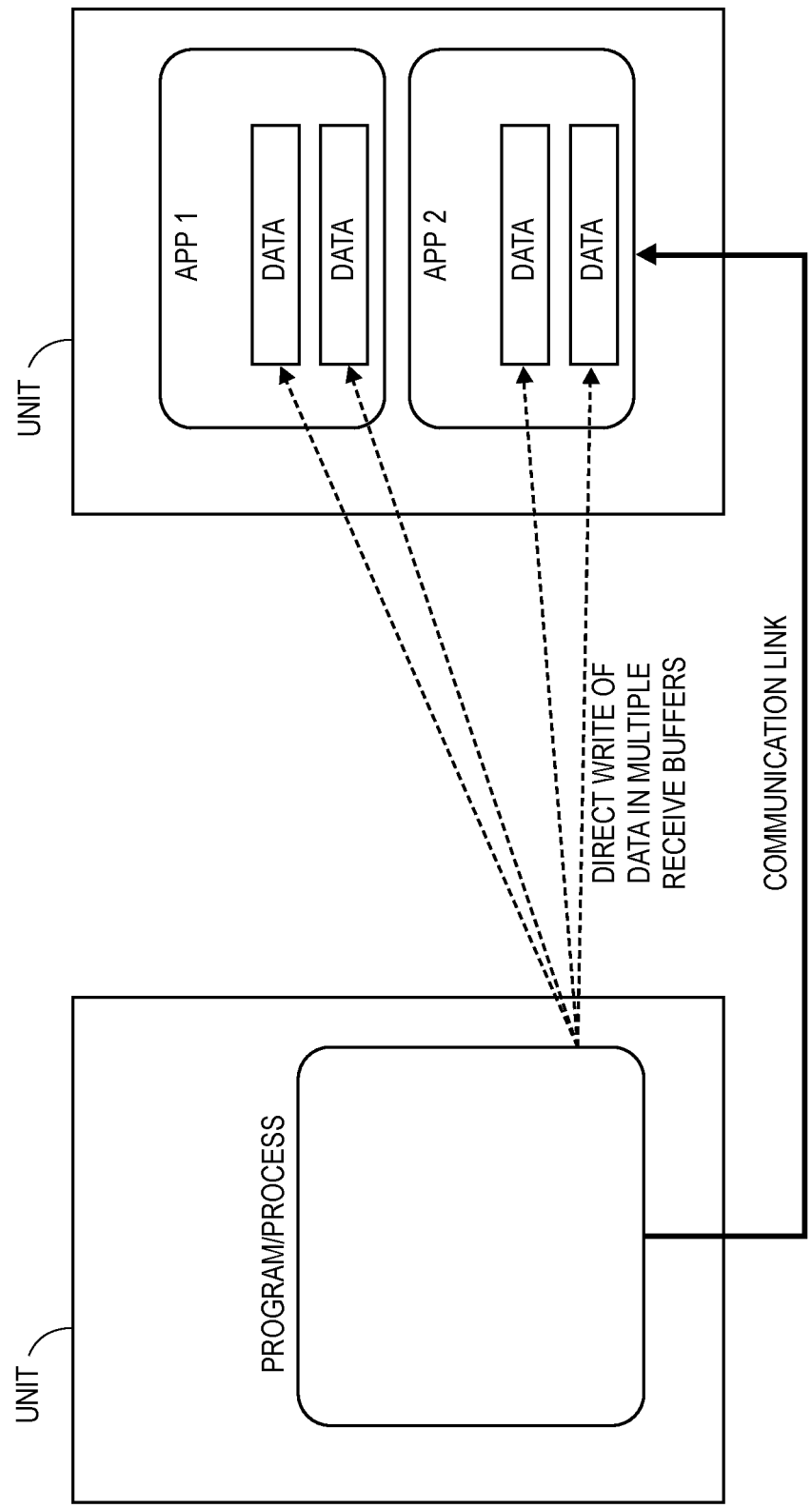
FIG. 6 is a diagram of one embodiment of the low latency communication channel operation to directly write to multiple receive buffers.

FIG. 5 is a diagram of one embodiment of the use of a tracking mechanism that is replicated at each end of the communication channel. In one example embodiment, to avoid the use of a remote read on the remote memory, the tracking structure 403 with the head and tail pointer are replicated at the sending and receiving processing unit. The receive buffer 401 can be specific to a single sender (i.e., a single process or application) and a single receiver (i.e., a single process or application) (a peer-to-peer connection) over a single communication channel. For multiple connections between a process or application and multiple processes or application, separate receive buffers are established for each connection and the associated tracking structures are replicated at the sender and receiver as shown in FIG. 6.

Returning to FIG. 5, each tail and head pointer pair can be allocated on a separate cache line. In an example multiprocessor system where each core has a local cache, performance can be improved by pinning the sending process to a core to avoid cache snoops when updating the head and tail pointer. The example implementation enables the head and tail pointer cache line that can be used to trigger power management wakeup and similar optimizations.

The fastest power management mechanism in current standard processors is a wake up from a clock stopped state, often denoted C1. Several modern processor cores also have similar power management states that better handles static power consumption by also supporting a lower "data retention" voltage on processor state and/or full power gating on logic that doesn't keep state. This power gating can be supported with low wakeup latency, e.g. ~100-300 ns or in the same order as a dynamic random access memory (DRAM) access. One example process to trigger wake-up is to monitor a memory address. For example, ARM processors can use a WFE (Wait for Event) instruction that allows a processor core to enter a power management state while hardware monitors updates to a specific cache line. The hardware monitor triggers a wake in response to detecting an update to the cache line. Similarly, x86 processors support waiting for an update to specified cache line using MONITOR and MWAIT instructions.

Figure 7:
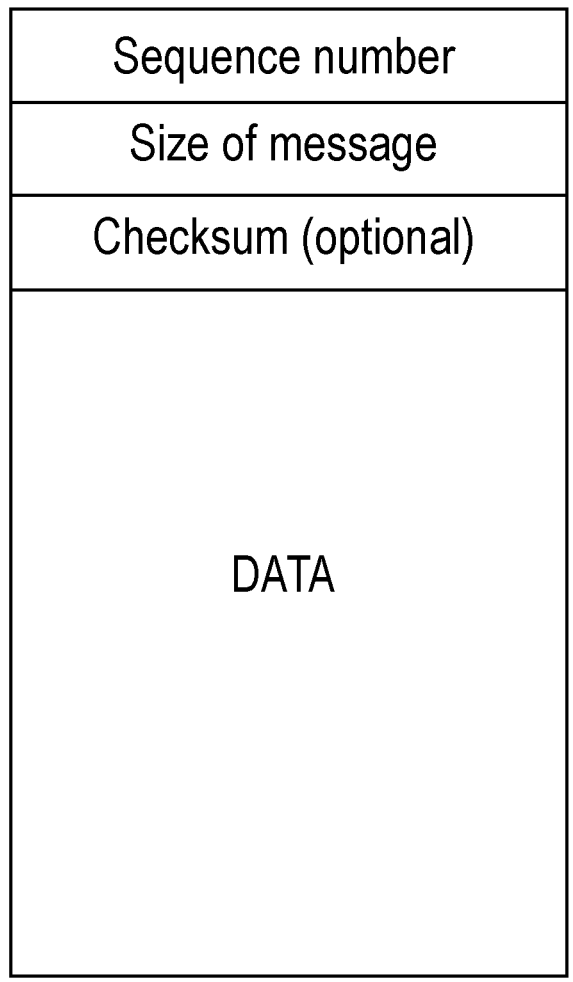
FIG. 7 is a diagram of one embodiment of a message format for the remote write.

FIG. 7 is a diagram of one embodiment of a format for the message and message header. In one embodiment, to further reduce the overhead of checking the head and tail pointer, a small header is added on each message. Thus, the message can include sequence number, message size and checksum fields. The sequence number can be an integer value that identifies the message in a sequence specific to the communication channel. For example, the first message can be given sequence number zero with each subsequent message having a next incremented sequence number. The size of message can be a number value that indicates a number of bits or bytes in the message as a whole or the data portion of the message. A checksum value can be included in some embodiments that is generated using any checksum or similar type of algorithm.

Returning again to FIG. 5 the general method for the operation of the receive buffer can be described in light of the further illustrations of FIG. 6 and FIG. 7. Where an application or process 205A at a first processing unit 209A establishes a communication channel with a process 205B at a second processing unit 209B a receive buffer 401 is established along with identical tracking structures 403. When the first process 205A sends a first message it writes a sequence number for the message to both tracking structures 403. The message and its data are written to the receive buffer 401. The application or process 205B at the second processing unit 209B is triggered to check the receive buffer by the update to the tracking structure 403. The application or process 205B fetches the received message from the receive buffer and updates the tracking structure 403 (e.g., updating the tail pointer). Detailed embodiments of the operation of sender and receiver processes are presented below with relation to FIGS. 8 and 9.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 8:
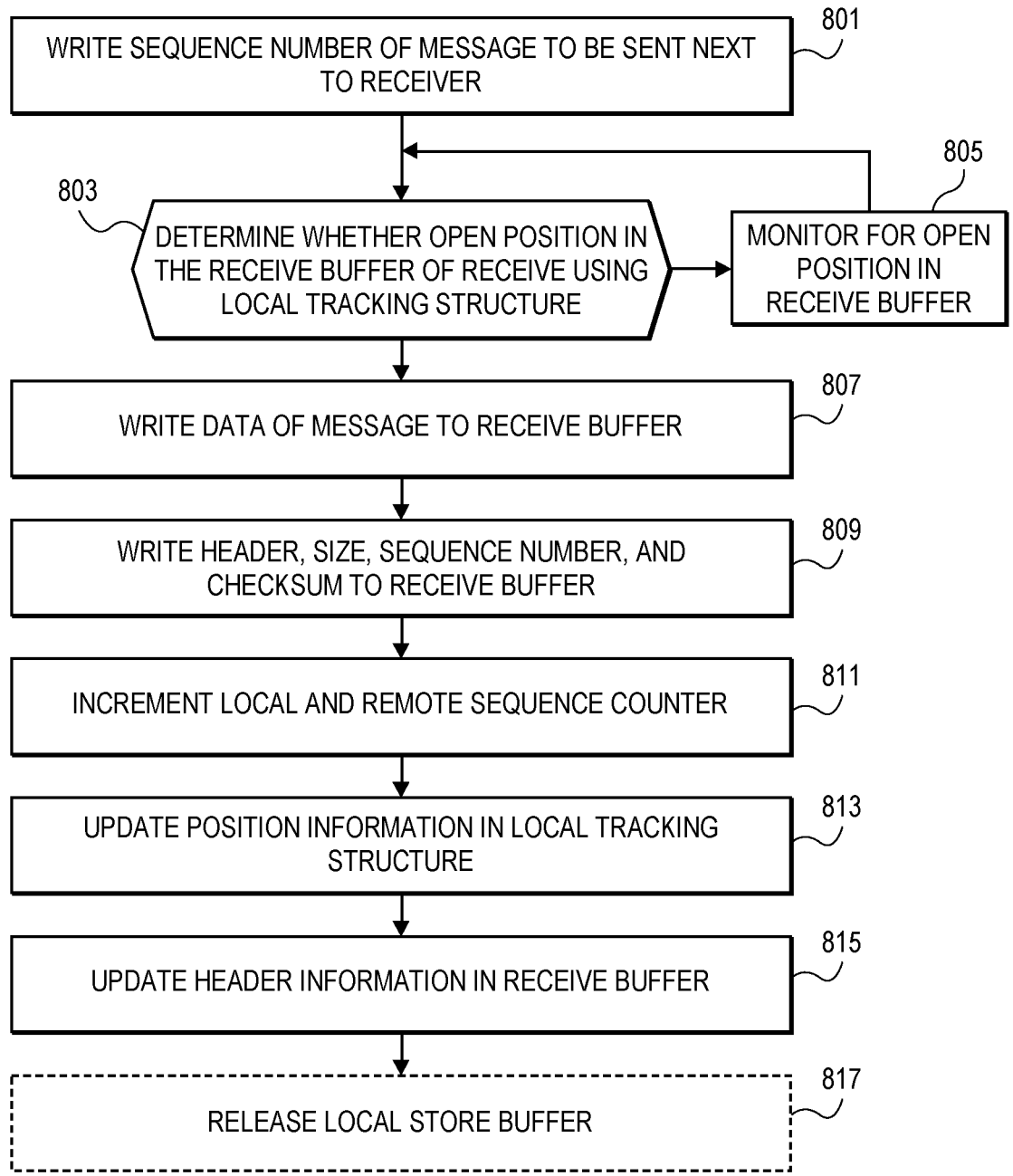
FIG. 8 is a flowchart of one embodiment of a process for sender of a remote write.

FIG. 8 is a flowchart of one embodiment of a method of the sending process using remote writes over the low latency communication channel. The sending process at the first processing unit initiates the sending of a message to the receiving process at a second processing unit.

Before sending any message on a communication channel, the sending process informs the receiving process of the initial sequence number of the message or messages to be sent over the communication channel. The sending process utilizes a remote write to the tracking structure for the receive buffer in the reserved memory for the communication channel at the second processing unit. The initial sequence number is written to the local and remote tracking structure copies and can be any value. In some embodiments, the initial sequence number is written to a location adjacent to the tail and head pointers in the local and remote copies of the tracking structure (i.e., in the same cache line). The writing of the sequence number is also done for every initialization/restart of the communication channel.

When the sending process has a message to send, then a remote write is performed to update the next expected sequence number (Block 801). The next expected sequence number can ban increment of the current or initial sequence number. The sending process then checks the head and tail pointers to identify whether there is enough free space, i.e., an open position, in the receive buffer of the corresponding application (Block 803). The check is performed using the local tracking structure. For example, the check can be a local read of the local copy of the head and tail pointer in the local copy of the tracking structure. If an open position is available with sufficient size for the message to be sent to the receive buffer then the process can proceed, otherwise the process can wait and continue to monitor for an opening in the receive buffer (Block 805). The sending process can also reply to a corresponding sending application that the receive buffer is congested to enable the application to take corrective or similar fault handling action. If the receive buffer is congested, the sending application can wait to be waked up when the tail pointer is updated in the local tracking structure (e.g., a change to the cache line for the information for the specific receive buffer). In some embodiments, the processing unit of the sending application and process can execute a power sleep operation to conserver power while waiting for the receive buffer to be available.

When the receive buffer has sufficient open space, the sending process performs a remote memory write of message data to the receive buffer, which is going to be used by the receiving application (Block 807). The remote memory write is performed with a target address that is in an area of the address space of a sending application that is mapped onto the receive buffer. Thus, the remote write can be, for example, a write or store instruction of the sending application that targets an address in the virtual address space of the application. Memory address mapping is discussed further herein with relation to FIGS. 11A and 11B. In some embodiments, the remote write is configured for write combination and the local store buffer is mapped as cacheable memory to optimize performance of the communication link. The receive buffer memory is a noncacheable memory and can be allocated as write combined at the sending machine. The receive buffer memory in the receiving machine is a cacheable memory. The position of the remote write is determined by the head pointer plus the size of the message header. In an example embodiment, the write of the message data is can be done by (1) loading a first part of the message data using a vector instruction if supported by the processing unit architecture. Typical vector operations allow for wide operations e.g. typically up to 128, 256 or 512-bit vectors. Vector instruction can be used (2) to calculate the checksum of the loaded data. This can be done on modern X86 architectures using vector instruction which operate on a 512-bit vector. The cost of calculating checksums is minimal when the data is already loaded in a vector. The remote write is performed (3) by using vector store operation on the position determined by the tail pointer plus the header. The sending process (4) loads the next consecutive part of the message data using vector instructions, performs checksum computation, and performs remote write on the next consecutive position in the receive buffer. These steps can be repeated until the full message is written to the receive buffer. The number of iterations is dependent on the size of the message and the vector instructions.

In the embodiments where vector instructions are used, if the data plus the header is larger than the vector instruction, a flush of the store buffers is performed for the communication channel to ensure that the data is received before the header, which signals completion of the remote write. This is done by issuing sfence instructions on X86 architectures when using NTB. Flushing the store buffer guarantees that the message data is available when the application associated with the receiving process fetches the message data from the receive buffer. In cases where the data and header are updated as one atomic transaction, then the explicit store buffer flush is not needed. Processor architectures and interface standards define the transactions that are guaranteed to be atomic, and portable implementations can take this into account. In some embodiments, larger atomic transactions can be utilized, for example updates within a single cache line using a vector instruction can perform a full cache line write that is atomic.

In some embodiments an activation vector is used. The activation vector is a cache line that has a set of bits that are monitored to detect changes to the bits, which can be used as a trigger. A sending process can set an appropriate bit in the activation vector and trigger a receiving process as a result of the update of the activation vector. The activation vector can be utilized across multiple communication channels with different bit positions corresponding to a given communication channel to enable an efficient way for a processing unit to detect activity for a communication channel.

After the message data is written to the receive buffer, then the sending process writes the message header information to the receive buffer (Block 809). Similarly, the sending process can write the size of the message, the current sequence number for the communication channel, and optionally a computed checksum for the message. The message however is not yet complete in the receive buffer and is not ready to be fetched by the application associated with the receive buffer. The header information is completed after the tracking structure information is successfully updated.

The sending process then increments the sequence number for the communication channel to the next sequence number using any sized increment (Block 811). The updated sequence number is the next expected sequence number on the communication link. The update of the sequence number includes incrementing the local sequence counter in the local tracking structure. The remote sequence counter is updated at the remote copy of the tracking structure such that both copies of the tracking structure have the new expected sequence number for messages.

The sending process updates the local head pointer to the next position in the remote units receive buffer (Block 813). The sending process then completes the update of the header information on the application provided receive buffer using a remote write (Block 815). The position of the remote write is determined by the tail pointer. This completes message header information making it ready for fetching by the application and the completion can trigger the application to perform the fetch. In some embodiments, the sending process then can force a flush of the store buffer for the communication channel (Block 817). Flushing the store buffer can be implemented to enable lower latency by ensuring that all parts of the message have been written to the receive buffer and the message transfer has completed. The data which is going to be used by the application is now available before the header is updated on the remote unit.

Figure 9:
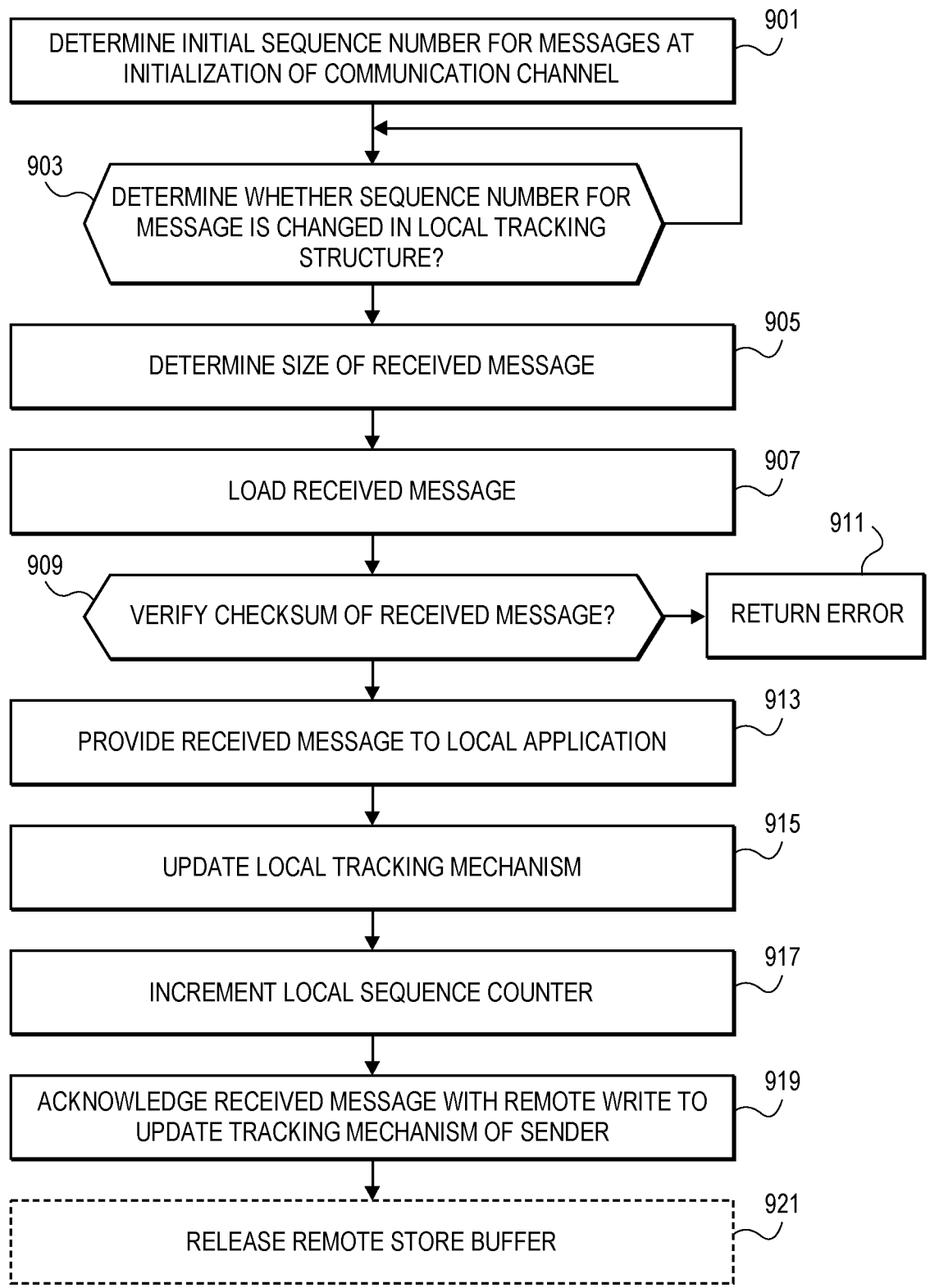
FIG. 9 is a flowchart of one embodiment of a process for a receiver of a remote write.

FIG. 9 is a flowchart of one embodiment of a process of the receiving process at the receiving unit to manage the receive buffer for the low latency communication channel. The receiver process manages the receive buffer on behalf of an associated application that will fetch and process the messages stored therein. The receiver process establishes the receive buffer and associated tracking structure during establishment of a communication channel with the send process.

The send process writes an initial sequence number into the tracking structure, which the receiver process checks and utilizes to determine when a change occurs caused by an update to the sequence number by the sending process that indicates a new message is to be sent (Block 901). The receiving process then continuously checks if the sequence number is matching the expected value (i.e., current value) (Block 903). In one embodiment, the receiving process can perform the check by reading the message header information in the receive buffer at the location that is identified by a tail pointer in the tracking structure. If the sequence number in the header information is not consistent with the next expected sequence number, then the receiving process can notify the application of the error or indicate an empty receive buffer. If the receive buffer is empty, the receiving process can wake the associated application when the sequence number changes at the position in receive buffer identified by the tail pointer. This wake up can be from an executed power sleep operation or similar power saving operation. In another embodiment, activation vector can be utilized to identify which receive buffer is to be active and thereby activate the associated application to poll and trigger sleep operation when queues are empty.

In the case where a message is determined to be incoming based on the sequence number change or similar update of a tracking structure (e.g., via an activation vector), the receiving process can check if the size of the message is larger than zero (Block 905). The message size can be determined by reading the header information of the message in the receive buffer that is identified by the tail pointer in the tracking structure. If the size is zero, then the receiver process can indicate an error, indicate that the receive buffer is empty, or similarly notify the application.

In the case that the header information has a next sequence number and a non-zero message size, the message data can be accessed (Block 907). The receiver process can copy the message data that is to be fetched by the application. The position in the receive buffer to access is identified by the tail pointer plus the size of the message header. In one example embodiment, the receive process can copy the message data by (1) loading a first part of the message data from the receive buffer using vector instruction where supported by the processing unit architecture. Vector operations can allow for wide operations e.g., up to 128, 256 or 512-bit vectors. The receiver process can (2) use vector instruction to calculate the checksum of the loaded message data. This can be done on modern X86 architecture using vector instruction which operate on 512-bit vector. The cost of calculating checksum is minimal when the data is already loaded in a vector. The sender process can perform remote write using a vector store operation to store the data of the first bytes of the message in the local receive buffer. The receiver process can (3) clear the message data which was loaded from the receive buffer using vector instructions. This prevents false sequence numbers from being utilized. The receiver process then loads the next consecutive part of the message data using a vector instruction, perform a checksum computation, and receive the next remote write on the next consecutive position in the receive buffer. This example process can continue until the entire message is received and fetched for the application.

After a copy of the full message data is received and accessed, the receiver process checks if a calculated checksum for the message data matches the checksum provided in the header information (Block 909). If not, then the receiver process returns a checksum error to the associated application (Block 911). If the checksum check is successful, then the full message has been properly received and fetched to the application (Block 913). The receiver process can then update the tracking structure (Block 915). For example, the receiver process can update the local tail pointer. Similarly, the receiver process increments the local sequence counter to a next sequence value (Block 917). The new sequence counter value in the tracking structure is the new expected sequence number. The receiver process performs a remote write to the sending processing unit to update the sending processing unit tail pointer in the corresponding tracking structure (Block 919). The remote update of the tail pointer provides acknowledgement of the received messaged, an update of the tracking structure to identify free positions in the receive buffer, and an optional wake up from a power sleep state. In some embodiments, the receiver process flushes a local store buffer that is utilized to perform the remote write that provides the acknowledgment in order to reduce latency (Block 921). This is done by issuing an sfence instruction, e.g., on X86 architecture.

The sending and receiver processes provide that all the messages on the low latency communication channel arrive in order. This is done by checking the sequence number in message header. The sender and receiver processes ensure that the message content is correct. This is done by checking the checksum value provided in message header with the calculated checksum. The checksum/sequence check is also done on the physical link when using NTB/RDMA. The embodiments ensure that both the hardware and software is reliable and able to detect faults. The embodiments of the low latency communication channel ensure that faults/congestions are immediately detected.

In some embodiments, the time spent by each processing unit in a clock stop state can be measured using performance counters. This allows the application user to measure the load when sending/fetching messages on the low latency communication channel when power management features are used. The measured load can be used for dimensioning (i.e., for implementing a service level agreement), and can be used to check the real performance compared with dimensional performance. The measurements can also be used for load regulation as the embodiments are able to measure the maximum performance on the communication channel and perform load regulation/back pressure in response to an over load.

Figure 10:
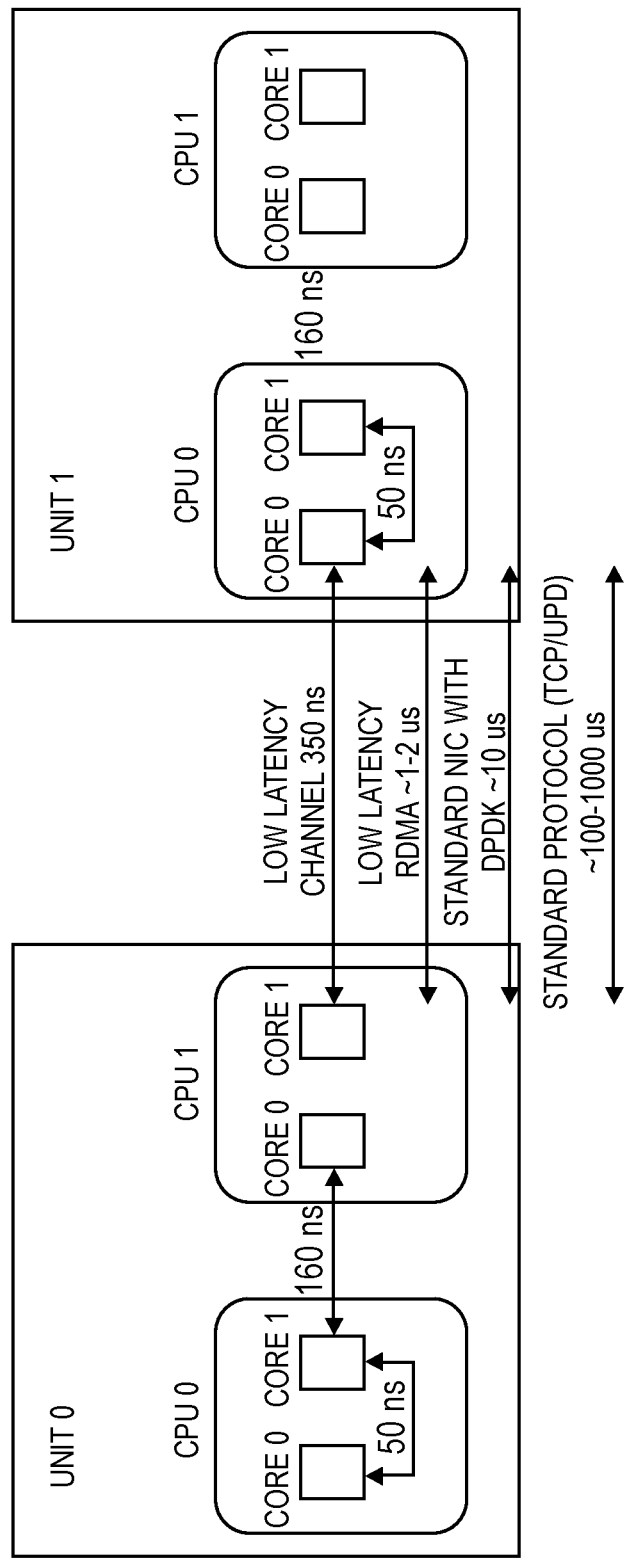
FIG. 10 is a diagram of one embodiment of an example low latency communication between cores of separate processing units.

FIG. 10 is a diagram that illustrates a multi-core example. The FIG. 10 shows latency when communication between cores, sockets and processing units occurs, e.g. when using two socket processors in processing units connected via NTB/RDMA/Ethernet. The low latency communication channel is able to fill the gap for inter-processing communication between processing unites. The latency when sending a message on a communication link based upon PCI is approximately 350 ns measured between two example multi-core and multi-socket machines. The low latency communication channel is approximately 3-6 times faster than a low latency RDMA capable network interface card (NIC). The low latency communication channel is approximately 100-1000 times faster than using a standard network protocol. The 350 ns communication latency is in the same range as inter-processing latency between processing units within the processing unit.

Further, the latency on the low latency communication channel is extremely deterministic. Measurements using 32 PCI lanes for the communication link and multiple low latency channels show that 300,000,000 64B messages per second could be transferred between different processing units. This is almost a line speed of a 200 Gbit Ethernet NIC.

In cloud computing systems, the use of the low latency communication channel is also possible. Small messages are common both for applications executed in the cloud and in the cloud infrastructure itself. The embodiments can be increasingly applicable when RDMA and similar technologies are more generally used within databases storage systems, when more latency critical applications are moved to cloud, and when cloud characteristics improve with new generations of processors. This will further increase the demand for low and predictable communication latency. Emerging cloud databases and cloud frameworks are also shifting to use RDMA and can benefit from the embodiments.

Figure 11A:
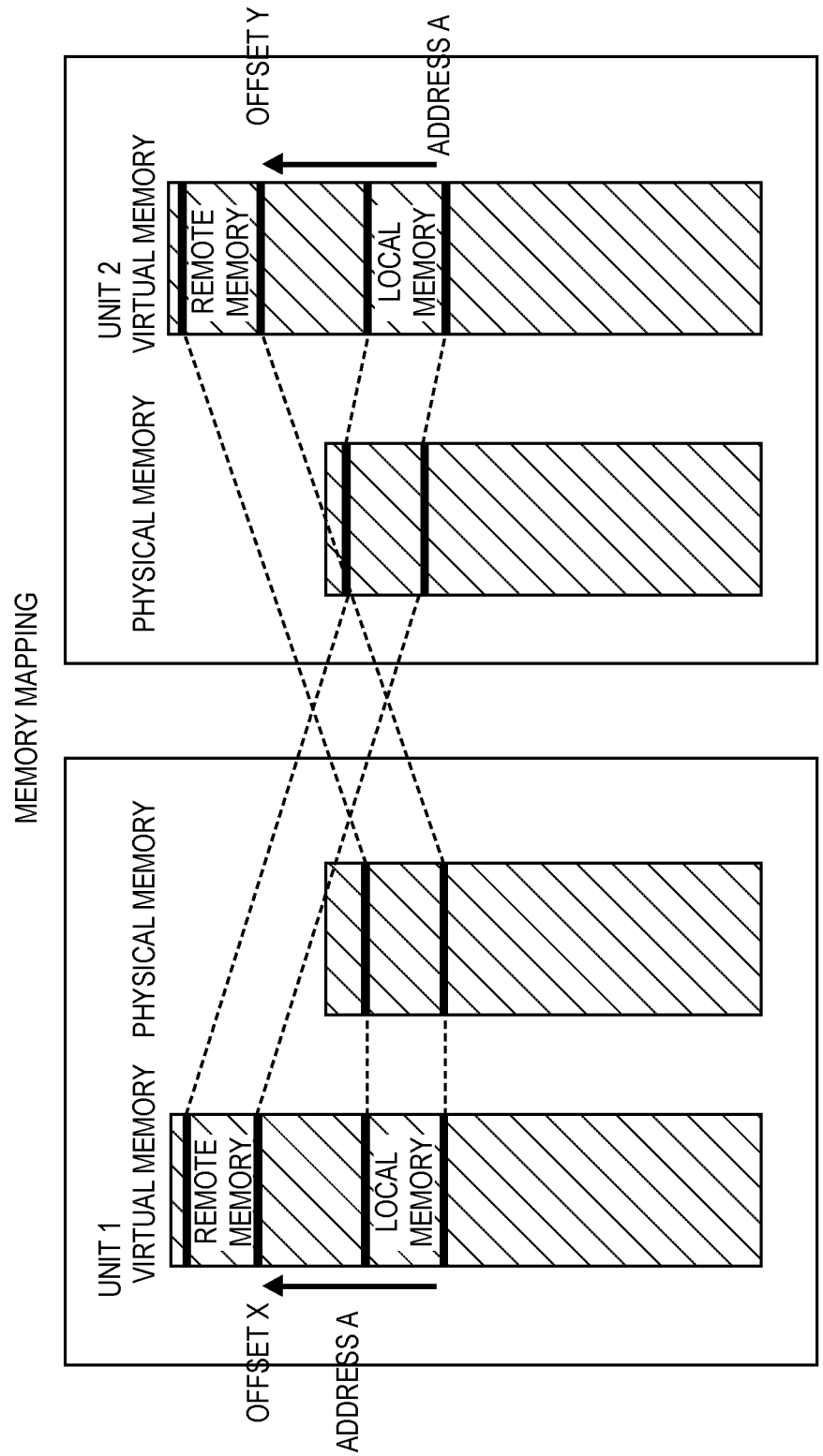
FIG. 11A is a diagram of one embodiment of a memory mapping between virtual and physical memory utilized by processing units communicating over a low latency communication channel.

FIG. 11A is a diagram of one embodiment of a memory mapping between virtual and physical memory utilized by processing units communicating over a low latency communication channel. In some embodiments, to simplify communication over the low latency communication channel, the local memory used for the low latency communication channel at each processing unit is mapped onto the same virtual address space. Thus, to perform a remote write to the memory of another processing unit, there is a window to address the remote processing unit's memory that is mapped with a fixed offset in the virtual address map.

The reserved memory for each processing unit can have a different fixed offset. FIG. 11A is an example that shows reserved memory of two processing units for sake of simplicity and clarity. Any number of processing units can communicate over a low latency communication channel and use the memory mapping scheme. For example, a reserved memory of a third processing unit can be mapped with a window with another fixed offset. Each processing unit has its own address map and the mappings of these offsets does not have to be aligned between processing units. A copy from a local memory to a remote memory of a remote processing unit is a copy from virtual address A in local memory to virtual address A plus the fixed offset x at the remote memory. It is also possible to write data to the remote memory without using the local memory dedicated to the low latency communication channel.

Thus, the embodiments enable thread to thread communication directly between an application on a first processing unit and an application on a second processing unit. The receive buffer at the receiving processing unit is memory mapped into the virtual address space of the application of the sending processing unit. This allows the application at the sending processing unit to write directly into the receive buffer form the processor of the sending processing unit, e.g., with a remote write implemented as a store instruction utilized by the application of the sending processing unit.

Figure 11B:
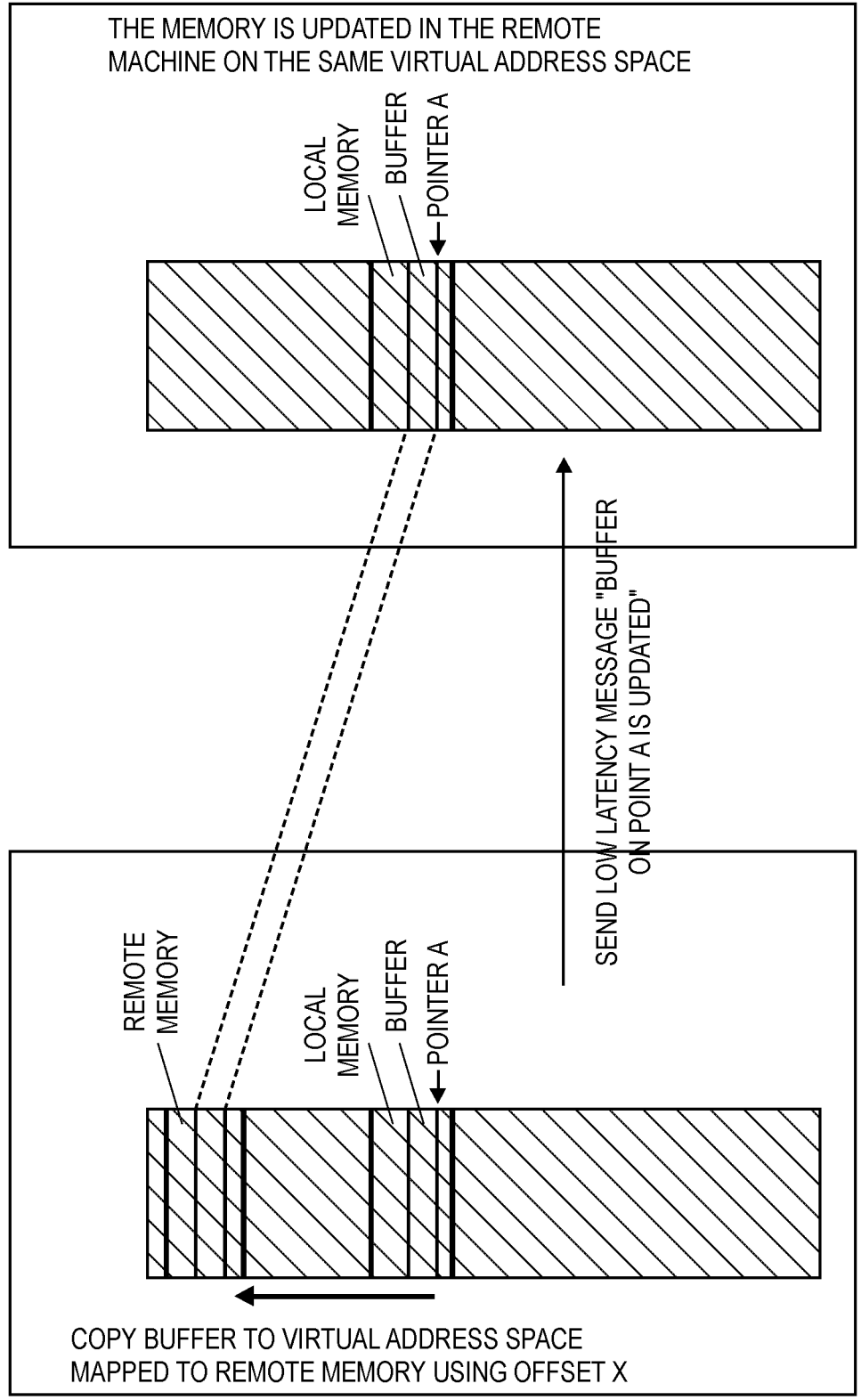
FIG. 11B is a diagram of one embodiment of a system using pointer references between processing units on a low latency communication channel.

FIG. 11B is a diagram of one embodiment of a system using pointer references between processing units on a low latency communication channel. The address mapping scheme enables the use of pointer references as part of the low latency communication. To transfer a large amount of data, a pointer reference to the transferred data can be used instead of sending data on the low latency channel, as illustrated in the example of FIG. 11B. The virtual memory A is in this case is first copied to the remote memory virtual address space X+A. This means also that the remote processing unit virtual memory A is now updated. The next step is then to send a low latency message containing pointer A to inform the application of the remote processing unit that the buffer at virtual address A is now updated. The low latency message uses the same communication link as the data transfer. As the communication link guarantees ordering, sending the low latency message after the data transfer also guarantees that all data is available when the low latency message arrives to the application.

Figure 12A:
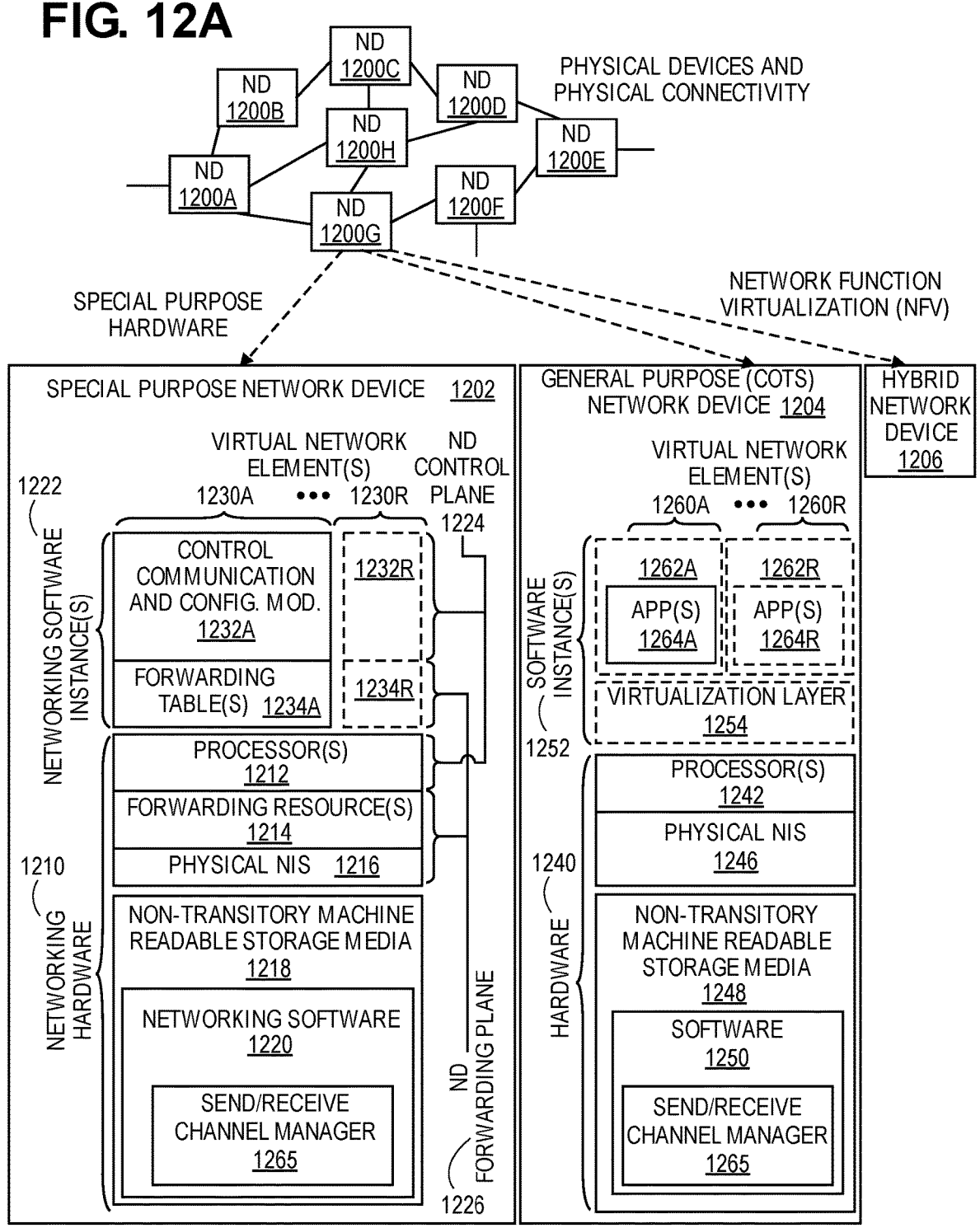
FIG. 12A illustrates connectivity between network devices (NDs) within an exemplary network, as well as three exemplary implementations of the NDs, according to some embodiments of the invention.

FIG. 12A illustrates connectivity between network devices (NDs) within an exemplary network, as well as three exemplary implementations of the NDs, according to some embodiments of the invention. FIG. 12A shows NDs 1200A-H, and their connectivity by way of lines between 1200A-1200B, 1200B-1200C, 1200C-1200D, 1200D-1200E, 1200E-1200F, 1200F-1200G, and 1200A-1200G, as well as between 1200H and each of 1200A, 1200C, 1200D, and 1200G. These NDs are physical devices, and the connectivity between these NDs can be wireless or wired (often referred to as a link). An additional line extending from NDs 1200A, 1200E, and 1200F illustrates that these NDs act as ingress and egress points for the network (and thus, these NDs are sometimes referred to as edge NDs; while the other NDs may be called core NDs).

Two of the exemplary ND implementations in FIG. 12A are: 1) a special-purpose network device 1202 that uses custom application-specific integrated-circuits (ASICs) and a special-purpose operating system (OS); and 2) a general purpose network device 1204 that uses common off-the-shelf (COTS) processors and a standard OS.

The special-purpose network device 1202 includes networking hardware 1210 comprising a set of one or more processor(s) 1212, forwarding resource(s) 1214 (which typically include one or more ASICs and/or network processors), and physical network interfaces (NIs) 1216 (through which network connections are made, such as those shown by the connectivity between NDs 1200A-H), as well as non-transitory machine readable storage media 1218 having stored therein networking software 1220. During operation, the networking software 1220 may be executed by the networking hardware 1210 to instantiate a set of one or more networking software instance(s) 1222. Each of the networking software instance(s) 1222, and that part of the networking hardware 1210 that executes that network software instance (be it hardware dedicated to that networking software instance and/or time slices of hardware temporally shared by that networking software instance with others of the networking software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R, such that a given virtual network element (e.g., 1230A) includes the control communication and configuration module (e.g., 1232A), a set of one or more forwarding table(s) (e.g., 1234A), and that portion of the networking hardware 1210 that executes the virtual network element (e.g., 1230A). The networking software 1220 can include a send/receive channel manager 1265 that performs the functions of the sending process and the receiver process described herein with relation to the sending and receiving functions for the low latency communication channel. In other embodiments, the send/receive channel manager 1265 functions are implemented in other components of the network device 1202 as a program instance and/or as distributed functions.

The special-purpose network device 1202 is often physically and/or logically considered to include: 1) a ND control plane 1224 (sometimes referred to as a control plane) comprising the processor(s) 1212 that execute the control communication and configuration module(s) 1232A-R; and 2) a ND forwarding plane 1226 (sometimes referred to as a forwarding plane, a data plane, or a media plane) comprising the forwarding resource(s) 1214 that utilize the forwarding table(s) 1234A-R and the physical NIs 1216. By way of example, where the ND is a router (or is implementing routing functionality), the ND control plane 1224 (the processor(s) 1212 executing the control communication and configuration module(s) 1232A-R) is typically responsible for participating in controlling how data (e.g., packets) is to be routed (e.g., the next hop for the data and the outgoing physical NI for that data) and storing that routing information in the forwarding table(s) 1234A-R, and the ND forwarding plane 1226 is responsible for receiving that data on the physical NIs 1216 and forwarding that data out the appropriate ones of the physical NIs 1216 based on the forwarding table(s) 1234A-R.

Figure 12B:
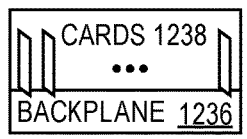
FIG. 12B illustrates an exemplary way to implement a special-purpose network device according to some embodiments of the invention.

FIG. 12B illustrates an exemplary way to implement the special-purpose network device 1202 according to some embodiments of the invention. FIG. 12B shows a special-purpose network device including cards 1238 (typically hot pluggable). While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1236 (e.g., a first full mesh coupling the line cards and a second full mesh coupling all of the cards).

Returning to FIG. 12A, the general purpose network device 1204 includes hardware 1240 comprising a set of one or more processor(s) 1242 (which are often COTS processors) and physical NIs 1246, as well as non-transitory machine readable storage media 1248 having stored therein software 1250. During operation, the processor(s) 1242 execute the software 1250 to instantiate one or more sets of one or more applications 1264A-R. While one embodiment does not implement virtualization, alternative embodiments may use different forms of virtualization. For example, in one such alternative embodiment the virtualization layer 1254 represents the kernel of an operating system (or a shim executing on a base operating system) that allows for the creation of multiple instances 1262A-R called software containers that may each be used to execute one (or more) of the sets of applications 1264A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1254 represents a hypervisor (sometimes referred to as a virtual machine monitor (VMM)) or a hypervisor executing on top of a host operating system, and each of the sets of applications 1264A-R is run on top of a guest operating system within an instance 1262A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1240, directly on a hypervisor (in which case the unikernel is sometimes described as running within a LibOS virtual machine), or in a software container, embodiments can be implemented fully with unikernels running directly on a hypervisor represented by virtualization layer 1254, unikernels running within software containers represented by instances 1262A-R, or as a combination of unikernels and the above-described techniques (e.g., unikernels and virtual machines both run directly on a hypervisor, unikernels and sets of applications that are run in different software containers).

The instantiation of the one or more sets of one or more applications 1264A-R, as well as virtualization if implemented, are collectively referred to as software instance(s) 1252. Each set of applications 1264A-R, corresponding virtualization construct (e.g., instance 1262A-R) if implemented, and that part of the hardware 1240 that executes them (be it hardware dedicated to that execution and/or time slices of hardware temporally shared), forms a separate virtual network element(s) 1260A-R. The software 1248 can include a send/receive channel manager 1265 that performs the functions of the sending process and the receiver process described herein with relation to the sending and receiving functions for the low latency communication channel. In other embodiments, the send/receive channel manager 1265 functions are implemented in other components of the network device 1202 as a program instance and/or as distributed functions.

The virtual network element(s) 1260A-R perform similar functionality to the virtual network element(s) 1230A-R—e.g., similar to the control communication and configuration module(s) 1232A and forwarding table(s) 1234A (this virtualization of the hardware 1240 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1262A-R corresponding to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1262A-R to VNEs also apply to embodiments where such a finer level of granularity and/or unikernels are used.

In certain embodiments, the virtualization layer 1254 includes a virtual switch that provides similar forwarding services as a physical Ethernet switch. Specifically, this virtual switch forwards traffic between instances 1262A-R and the physical NI(s) 1246, as well as optionally between the instances 1262A-R; in addition, this virtual switch may enforce network isolation between the VNEs 1260A-R that by policy are not permitted to communicate with each other (e.g., by honoring virtual local area networks (VLANs)).

The third exemplary ND implementation in FIG. 12A is a hybrid network device 1206, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1202) could provide for para-virtualization to the networking hardware present in the hybrid network device 1206.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical NIs (e.g., 1216, 1246). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 12C:
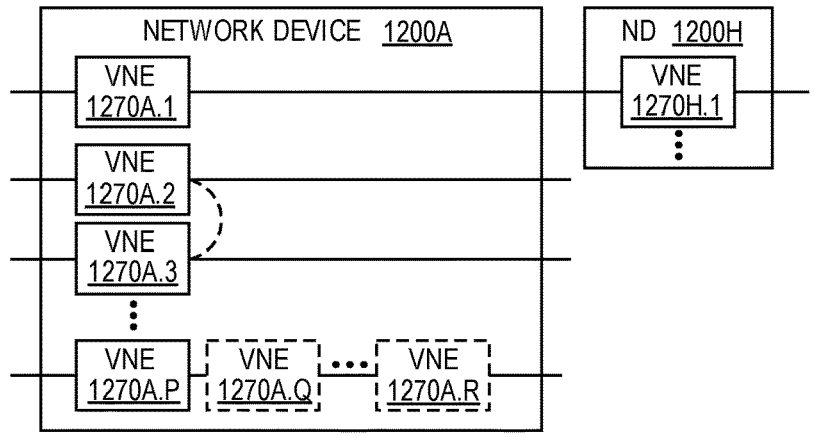
FIG. 12C illustrates various exemplary ways in which virtual network elements (VNEs) may be coupled according to some embodiments of the invention.

FIG. 12C illustrates various exemplary ways in which VNEs may be coupled according to some embodiments of the invention. FIG. 12C shows VNEs 1270A.1-1270A.P (and optionally VNEs 1270A.Q-1270A.R) implemented in ND 1200A and VNE 1270H.1 in ND 1200H. In FIG. 12C, VNEs 1270A.1-P are separate from each other in the sense that they can receive packets from outside ND 1200A and forward packets outside of ND 1200A; VNE 1270A.1 is coupled with VNE 1270H.1, and thus they communicate packets between their respective NDs; VNE 1270A.2-1270A.3 may optionally forward packets between themselves without forwarding them outside of the ND 1200A; and VNE 1270A.P may optionally be the first in a chain of VNEs that includes VNE 1270A.Q followed by VNE 1270A.R (this is sometimes referred to as dynamic service chaining, where each of the VNEs in the series of VNEs provides a different service—e.g., one or more layer 4-7 network services). While FIG. 12C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 12A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 12A may also host one or more such servers (e.g., in the case of the general purpose network device 1204, one or more of the software instances 1262A-R may operate as servers; the same would be true for the hybrid network device 1206; in the case of the special-purpose network device 1202, one or more such servers could also be run on a virtualization layer executed by the processor(s) 1212); in which case the servers are said to be co-located with the VNEs of that ND.

A virtual network is a logical abstraction of a physical network (such as that in FIG. 12A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 12D:
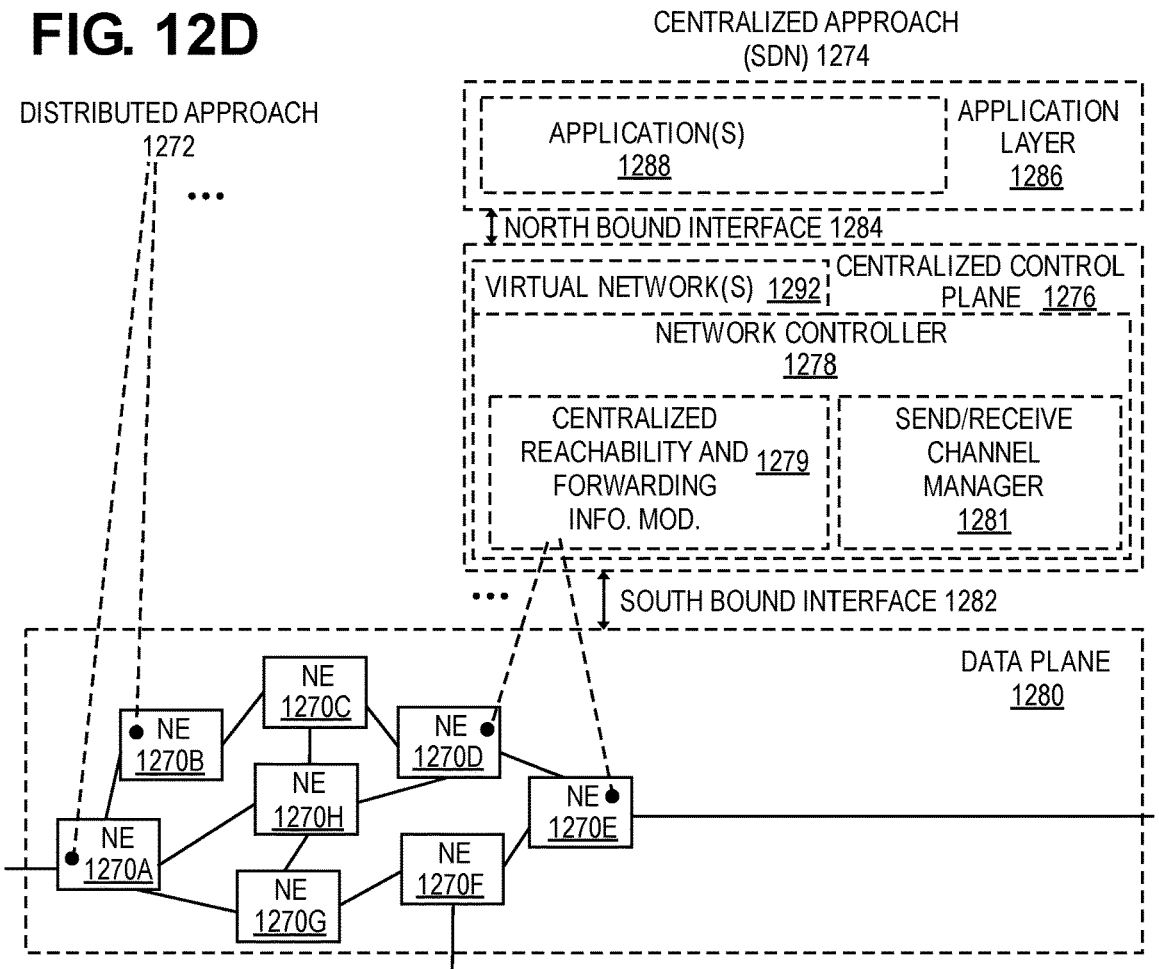
FIG. 12D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 12D illustrates a network with a single network element on each of the NDs of FIG. 12A, and within this straight forward approach contrasts a traditional distributed approach (commonly used by traditional routers) with a centralized approach for maintaining reachability and forwarding information (also called network control), according to some embodiments of the invention. Specifically, FIG. 12D illustrates network elements (NEs) 1270A-H with the same connectivity as the NDs 1200A-H of FIG. 12A.

FIG. 12D illustrates that the distributed approach 1272 distributes responsibility for generating the reachability and forwarding information across the NEs 1270A-H; in other words, the process of neighbor discovery and topology discovery is distributed.

For example, where the special-purpose network device 1202 is used, the control communication and configuration module(s) 1232A-R of the ND control plane 1224 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1270A-H (e.g., the processor(s) 1212 executing the control communication and configuration module(s) 1232A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1224. The ND control plane 1224 programs the ND forwarding plane 1226 with information (e.g., adjacency and route information) based on the routing structure(s). For example, the ND control plane 1224 programs the adjacency and route information into one or more forwarding table(s) 1234A-R (e.g., Forwarding Information Base (FIB), Label Forwarding Information Base (LFIB), and one or more adjacency structures) on the ND forwarding plane 1226. For layer 2 forwarding, the ND can store one or more bridging tables that are used to forward data based on the layer 2 information in that data. While the above example uses the special-purpose network device 1202, the same distributed approach 1272 can be implemented on the general purpose network device 1204 and the hybrid network device 1206.

FIG. 12D illustrates that a centralized approach 1274 (also known as software defined networking (SDN)) that decouples the system that makes decisions about where traffic is sent from the underlying systems that forwards traffic to the selected destination. The illustrated centralized approach 1274 has the responsibility for the generation of reachability and forwarding information in a centralized control plane 1276 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1276 has a south bound interface 1282 with a data plane 1280 (sometime referred to the infrastructure layer, network forwarding plane, or forwarding plane (which should not be confused with a ND forwarding plane)) that includes the NEs 1270A-H (sometimes referred to as switches, forwarding elements, data plane elements, or nodes). The centralized control plane 1276 includes a network controller 1278, which includes a centralized reachability and forwarding information module 1279 that determines the reachability within the network and distributes the forwarding information to the NEs 1270A-H of the data plane 1280 over the south bound interface 1282 (which may use the OpenFlow protocol). Thus, the network intelligence is centralized in the centralized control plane 1276 executing on electronic devices that are typically separate from the NDs. The network controller 1278 can include send/receive channel manager 1281 support as described herein. In other embodiments, the send/receive channel manager 1281 functions are implemented in other components of the controller as a program instance and/or as distributed functions.

For example, where the special-purpose network device 1202 is used in the data plane 1280, each of the control communication and configuration module(s) 1232A-R of the ND control plane 1224 typically include a control agent that provides the VNE side of the south bound interface 1282. In this case, the ND control plane 1224 (the processor(s) 1212 executing the control communication and configuration module(s) 1232A-R) performs its responsibility for participating in controlling how data (e.g., packets) is to be routed (e.g., the next hop for the data and the outgoing physical NI for that data) through the control agent communicating with the centralized control plane 1276 to receive the forwarding information (and in some cases, the reachability information) from the centralized reachability and forwarding information module 1279 (it should be understood that in some embodiments of the invention, the control communication and configuration module(s) 1232A-R, in addition to communicating with the centralized control plane 1276, may also play some role in determining reachability and/or calculating forwarding information—albeit less so than in the case of a distributed approach; such embodiments are generally considered to fall under the centralized approach 1274, but may also be considered a hybrid approach).

While the above example uses the special-purpose network device 1202, the same centralized approach 1274 can be implemented with the general purpose network device 1204 (e.g., each of the VNE 1260A-R performs its responsibility for controlling how data (e.g., packets) is to be routed (e.g., the next hop for the data and the outgoing physical NI for that data) by communicating with the centralized control plane 1276 to receive the forwarding information (and in some cases, the reachability information) from the centralized reachability and forwarding information module 1279; it should be understood that in some embodiments of the invention, the VNEs 1260A-R, in addition to communicating with the centralized control plane 1276, may also play some role in determining reachability and/or calculating forwarding information—albeit less so than in the case of a distributed approach) and the hybrid network device 1206. In fact, the use of SDN techniques can enhance the NFV techniques typically used in the general purpose network device 1204 or hybrid network device 1206 implementations as NFV is able to support SDN by providing an infrastructure upon which the SDN software can be run, and NFV and SDN both aim to make use of commodity server hardware and physical switches.

FIG. 12D also shows that the centralized control plane 1276 has a north bound interface 1284 to an application layer 1286, in which resides application(s) 1288. The centralized control plane 1276 has the ability to form virtual networks 1292 (sometimes referred to as a logical forwarding plane, network services, or overlay networks (with the NEs 1270A-H of the data plane 1280 being the underlay network)) for the application(s) 1288. Thus, the centralized control plane 1276 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 12D shows the distributed approach 1272 separate from the centralized approach 1274, the effort of network control may be distributed differently or the two combined in certain embodiments of the invention. For example: 1) embodiments may generally use the centralized approach (SDN) 1274, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1274, but may also be considered a hybrid approach.

While FIG. 12D illustrates the simple case where each of the NDs 1200A-H implements a single NE 1270A-H, it should be understood that the network control approaches described with reference to FIG. 12D also work for networks where one or more of the NDs 1200A-H implement multiple VNEs (e.g., VNEs 1230A-R, VNEs 1260A-R, those in the hybrid network device 1206). Alternatively or in addition, the network controller 1278 may also emulate the implementation of multiple VNEs in a single ND. Specifically, instead of (or in addition to) implementing multiple VNEs in a single ND, the network controller 1278 may present the implementation of a VNE/NE in a single ND as multiple VNEs in the virtual networks 1292 (all in the same one of the virtual network(s) 1292, each in different ones of the virtual network(s) 1292, or some combination). For example, the network controller 1278 may cause an ND to implement a single VNE (a NE) in the underlay network, and then logically divide up the resources of that NE within the centralized control plane 1276 to present different VNEs in the virtual network(s) 1292 (where these different VNEs in the overlay networks are sharing the resources of the single VNE/NE implementation on the ND in the underlay network).

Figure 12E:
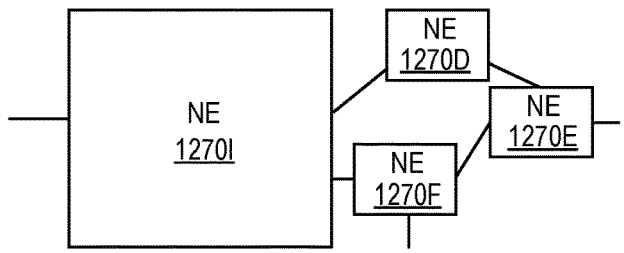
FIG. 12E illustrates the simple case of where each of the NDs implements a single NE, but a centralized control plane has abstracted multiple of the NEs in different NDs into (to represent) a single NE in one of the virtual network(s), according to some embodiments of the invention.
Figure 12F:
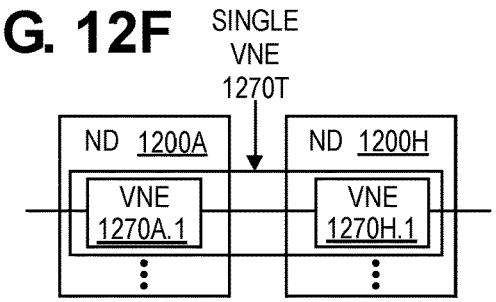
FIG. 12F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 12E and 12F respectively illustrate exemplary abstractions of NEs and VNEs that the network controller 1278 may present as part of different ones of the virtual networks 1292. FIG. 12E illustrates the simple case of where each of the NDs 1200A-H implements a single NE 1270A-H (see FIG. 12D), but the centralized control plane 1276 has abstracted multiple of the NEs in different NDs (the NEs 1270A-C and G-H) into (to represent) a single NE 12701 in one of the virtual network(s) 1292 of FIG. 12D, according to some embodiments of the invention. FIG. 12E shows that in this virtual network, the NE 12701 is coupled to NE 1270D and 1270F, which are both still coupled to NE 1270E.

FIG. 12F illustrates a case where multiple VNEs (VNE 1270A.1 and VNE 1270H.1) are implemented on different NDs (ND 1200A and ND 1200H) and are coupled to each other, and where the centralized control plane 1276 has abstracted these multiple VNEs such that they appear as a single VNE 1270T within one of the virtual networks 1292 of FIG. 12D, according to some embodiments of the invention. Thus, the abstraction of a NE or VNE can span multiple NDs.

While some embodiments of the invention implement the centralized control plane 1276 as a single entity (e.g., a single instance of software running on a single electronic device), alternative embodiments may spread the functionality across multiple entities for redundancy and/or scalability purposes (e.g., multiple instances of software running on different electronic devices).

Figure 13:
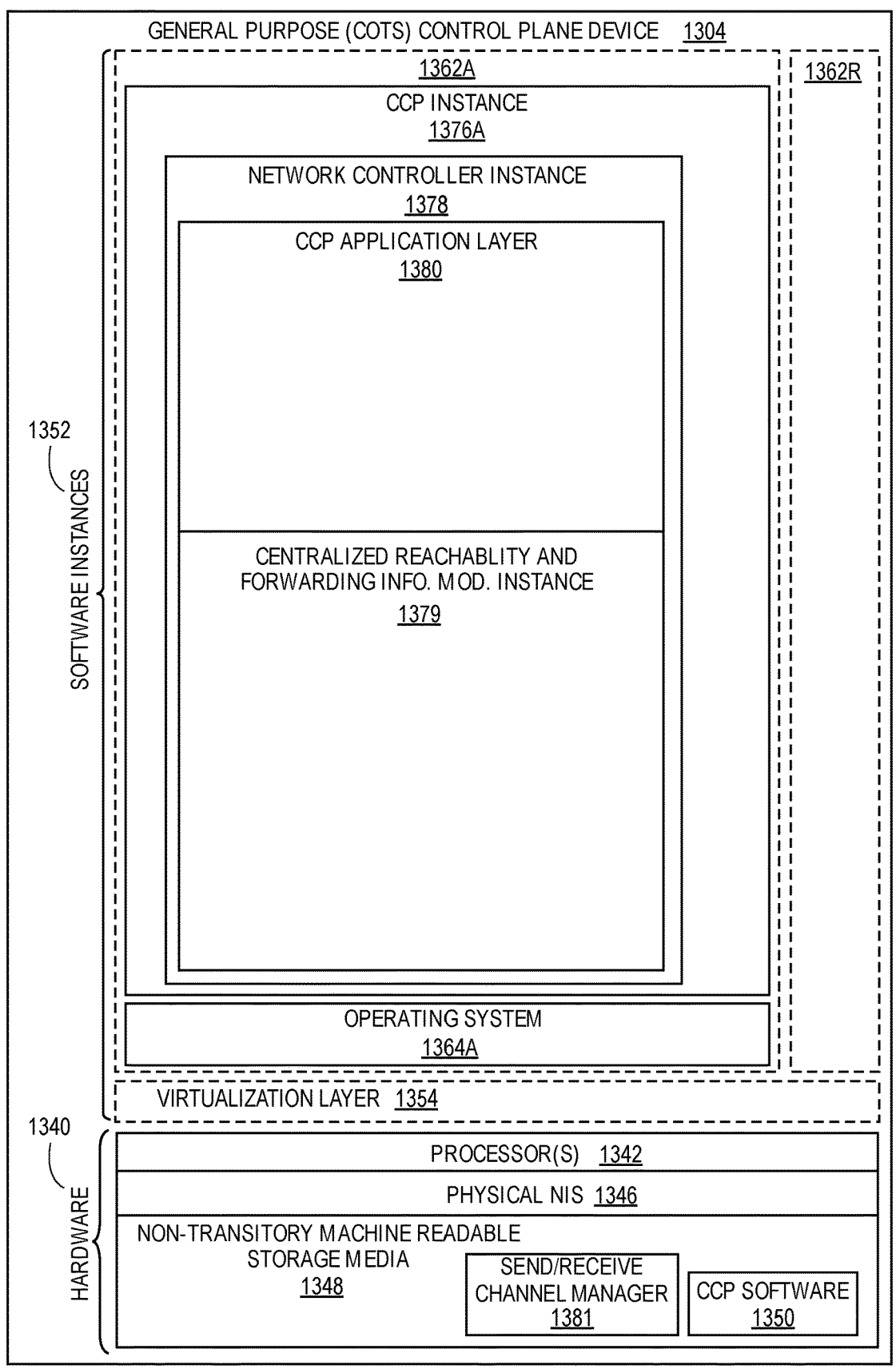
FIG. 13 illustrates a general purpose control plane device with centralized control plane (CCP) software 1350), according to some embodiments of the invention.

Similar to the network device implementations, the electronic device(s) running the centralized control plane 1276, and thus the network controller 1278 including the centralized reachability and forwarding information module 1279, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 13 illustrates, a general purpose control plane device 1304 including hardware 1340 comprising a set of one or more processor(s) 1342 (which are often COTS processors) and physical NIs 1346, as well as non-transitory machine readable storage media 1348 having stored therein centralized control plane (CCP) software 1350.

In embodiments that use compute virtualization, the processor(s) 1342 typically execute software to instantiate a virtualization layer 1354 (e.g., in one embodiment the virtualization layer 1354 represents the kernel of an operating system (or a shim executing on a base operating system) that allows for the creation of multiple instances 1362A-R called software containers (representing separate user spaces and also called virtualization engines, virtual private servers, or jails) that may each be used to execute a set of one or more applications; in another embodiment the virtualization layer 1354 represents a hypervisor (sometimes referred to as a virtual machine monitor (VMM)) or a hypervisor executing on top of a host operating system, and an application is run on top of a guest operating system within an instance 1362A-R called a virtual machine (which in some cases may be considered a tightly isolated form of software container) that is run by the hypervisor; in another embodiment, an application is implemented as a unikernel, which can be generated by compiling directly with an application only a limited set of libraries from a library operating system (LibOS) including drivers/libraries of OS services) that provide the particular OS services needed by she application, and the unikernel can run directly on hardware 1340, directly on a hypervisor represented by virtualization layer 1354 (in which case the unikernel is sometimes described as running within a LibOS virtual machine), or in a software container represented by one of instances 1362A-R). Again, in embodiments where compute virtualization is used, during operation an instance of the CCP software 1350 (illustrated as CCP instance 1376A) is executed (e.g., within the instance 1362A) on the virtualization layer 1354. In embodiments where compute virtualization is not used, the CCP instance 1376A is executed, as a unikernel or on top of a host operating system, on the "bare metal" general purpose control plane device 1304. The instantiation of the CCP instance 1376A, as well as the virtualization layer 1354 and instances 1362A-R if implemented, are collectively referred to as software instance(s) 1352.

In some embodiments, the CCP instance 1376A includes a network controller instance 1378. The network controller instance 1378 includes a centralized reachability and forwarding information module instance 1379 (which is a middleware layer providing the context of the network controller 1278 to the operating system and communicating with the various NEs), and an CCP application layer 1380 (sometimes referred to as an application layer) over the middleware layer (providing the intelligence required for various network operations such as protocols, network situational awareness, and user—interfaces). At a more abstract level, this CCP application layer 1380 within the centralized control plane 1276 works with virtual network view(s) (logical view(s) of the network) and the middleware layer provides the conversion from the virtual networks to the physical view. The networking controller instance 1378 can include send/receive channel manager 1381 support as described herein. In other embodiments, the send/receive channel manager 1381 functions are implemented in other components of the network device 1202 as a program instance and/or as distributed functions.

The centralized control plane 1276 transmits relevant messages to the data plane 1280 based on CCP application layer 1380 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1280 may receive different messages, and thus different forwarding information. The data plane 1280 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1280, the packet (or a subset of the packet header and content) is typically forwarded to the centralized control plane 1276. The centralized control plane 1276 will then program forwarding table entries into the data plane 1280 to accommodate packets belonging to the flow of the unknown packet. Once a specific forwarding table entry has been programmed into the data plane 1280 by the centralized control plane 1276, the next packet with matching credentials will match that forwarding table entry and take the set of actions associated with that matched entry.

Additional Example Embodiment(s)

Figure 14:
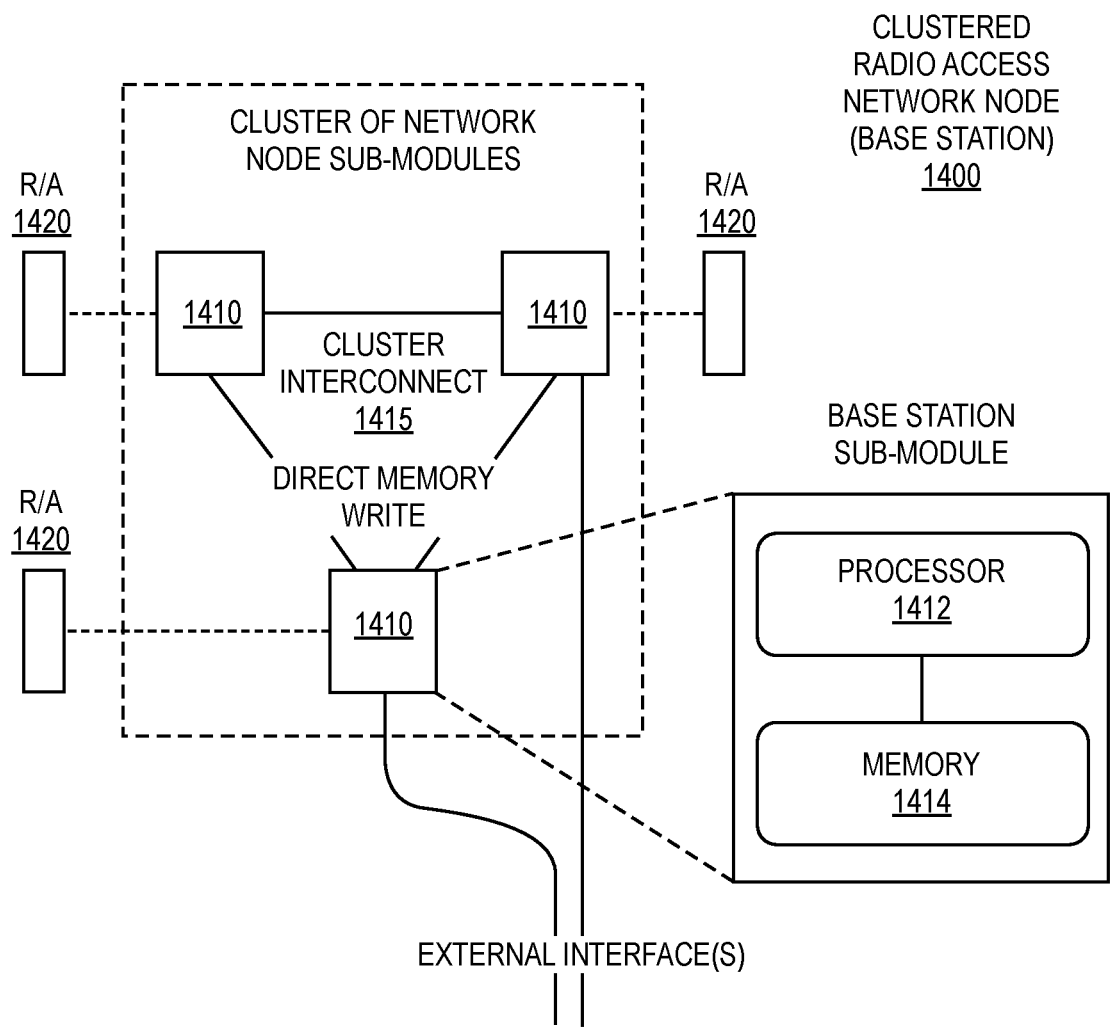
FIG. 14 is a schematic diagram illustrating an example of a clustered radio access network node according to an embodiment.

FIG. 14 is a schematic diagram illustrating an example of a clustered radio access network node according to an embodiment. The radio access network node 1400 is configured to be implemented as a clustered system comprising a cluster of at least two interconnected network node sub-modules 1410, each of which comprises a processing unit such as a processor 1412 and memory 1414, and the memory 1414 comprises a data structure. At least one of the network node sub-modules 1410 is configured to manage at least one radio and/or antenna (R/A) unit 1420. The radio access network node 1400 has a communication mechanism, also referred to as a cluster interconnect 1415, for communication between the network node sub-modules 1410, and the communication mechanism is configured to enable a direct memory write operation from at least one network node sub-module 1410 into the data structure of at least one other network node sub-module 1410.

In this way, a highly effective clustered radio access network node such as a base station can be provided for a wireless communication system. The embodiments enable high performance, low latency communication between network node sub-modules in the cluster of interconnected network node sub-modules.

In other words, at least part of the radio access network node functionality may be configured to be distributed in the cluster of interconnected network node sub-modules.

The network node sub-modules may sometimes be referred to as sub-modules, and/or members and/or participants and/or units.

For example, the radio access network node may be a base station and the network node sub-modules may be base station sub-modules.

By way of example, the radio access network node 1400 may be configured to be implemented as a distributed application running on the cluster of interconnected network node sub-modules 1410. For example, cluster middleware can be used for implementing functions for supporting distribution of information, replicating data and keeping data consistency, achieving quorum, electing leaders and so forth. As an example, the distributed application may be an application configured to perform baseband processing, packet processing, and/or control processing for the radio access network node.

For example, at least one of the network node sub-modules 1410 may be configured to perform baseband processing, packet processing and/or control processing. The conventional baseband module may be replaced by one or more of the interconnected network node sub-modules.

It should also be understood that there may be additional network node sub-modules that may not be configured to manage any radio and/or antenna (R/A) unit, but may be customized for specific digital processing.

It should also be understood that the term radio and/or antenna unit may refer to radio units, antenna units and any combination thereof, including conventional radio and antenna units, remote radio heads and radio dots, as well as analog and/or digital radio parts. In this regard, it must also be understood that the network node sub-modules may include converter(s) for providing digital and/or analog output signals for the radio and/or antenna units, all depending on the desired choice of implementation.

One or more of the network node sub-modules may also be connected to external interfaces such as Si and/or X2 interfaces.

As an example, at least one of the network node sub-modules 1410 may be configured to manage at least one cell within the wireless communication system.

In a particular example, the processing unit such as the processor 1412 of at least one of the network node sub-module 1410 is configured to perform a direct memory write operation (i.e., a remote write) to at least one other network node sub-module according to the embodiments described herein above.

Although the radio access network node may be configured as a distributed application running on a cluster of interconnected network node sub-modules, the actual physical organization of the sub-modules may be either centralized or distributed.

As an example, the cluster of interconnected network node sub-modules 1410 may be physically centralized in the same location. For example, the sub-modules may be located in the same cabinet or room.

Alternatively, the cluster of interconnected network node sub-modules 1410 may be physically distributed. For example, the radio and/or antenna units 1420 of the radio access network node 1400 may be distributed and each of at least a subset of the network node sub-modules 1410 may be integrated physically with the corresponding radio and/or antenna unit 1420.

By way of example, the network node sub-modules 1410 may be configured to communicate based on a cluster interconnect 1415 using direct links and/or indirect links between the network node sub-modules 1410.

In a particular example, the network node sub-modules 1410 are configured to communicate based on a cluster interconnect 1415 using a full mesh with direct links between the network node sub-modules 1410.

Alternatively, the network node sub-modules 1410 may be configured to communicate based on a cluster interconnect 1415 using a mesh with direct links and/or multi-hop links between the network node sub-modules 1410.

If desired, the cluster interconnect may be configured as a redundant interconnect with one or more reserve or alternative paths in order to be able to handle interconnection faults.

In another particular example, the network node sub-modules 1410 are configured to communicate based on a cluster interconnect 1415 using a switched network to interconnect the network node sub-modules 1410.

In a particular example, the cluster interconnect 1415 may be based on Peripheral Component Interconnect, PCI, and/or Ethernet technology.

Figure 15:
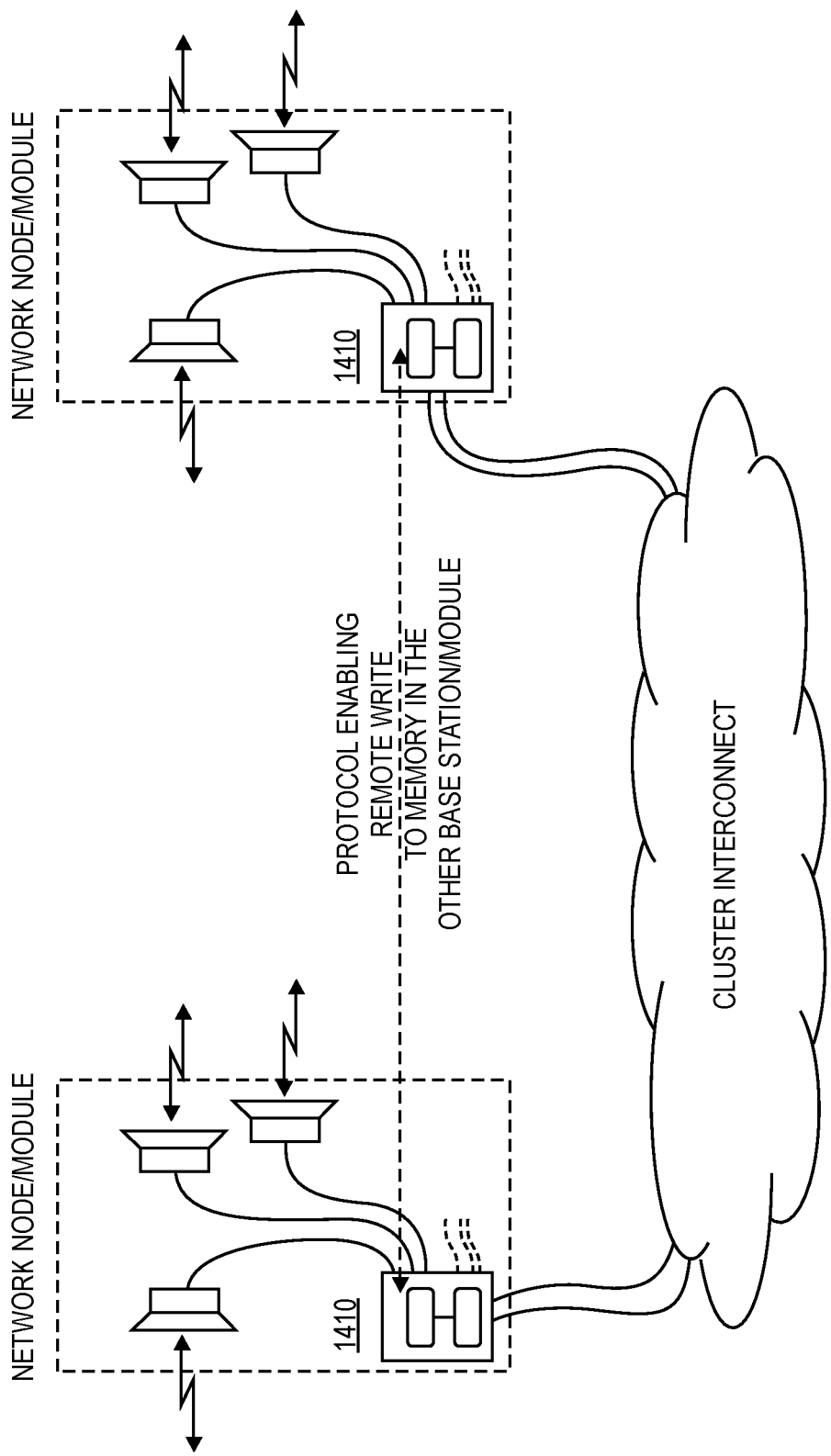
FIG. 15 is a schematic diagram illustrating an example of a cluster of radio access network nodes and/or network node sub-modules interconnected by means of a "cloud-based" cluster interconnect.

FIG. 15 is a schematic diagram illustrating an example of a cluster of radio access network nodes and/or network node sub-modules interconnected by means of a "cloud-based" cluster interconnect. The remote write communication process described herein in this context as well.

Figure 16:
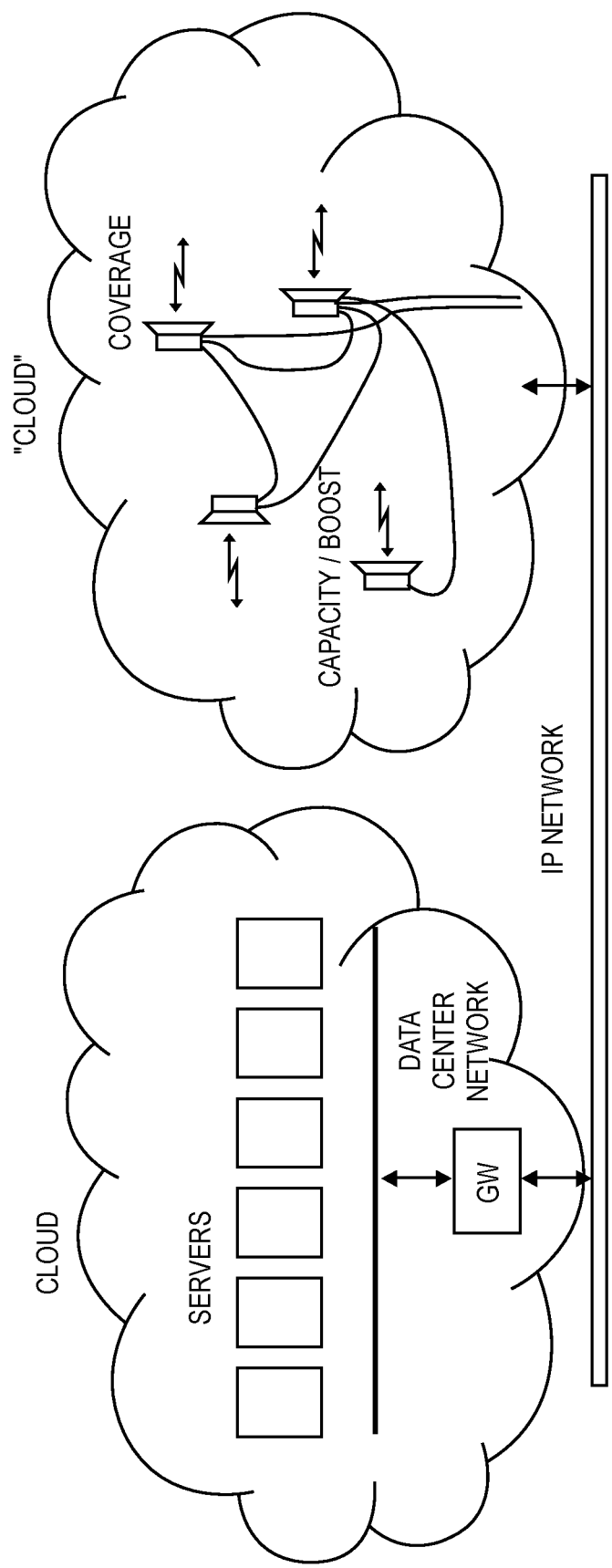
FIG. 16 is a schematic diagram illustrating a comparative example of an execution cloud and a radio protocol cloud.

FIG. 16 is a schematic diagram illustrating a comparative example of an execution cloud and a radio protocol cloud.

A current trend in Radio Access Network (RAN) development is to move functionality to datacenters in the cloud for achieving resilience, scalability, ease of maintenance and so forth. The key enabler for this is that the software is designed as a scalable distributed application.

The embodiments enable implementing scalable and distributed applications also near the radio, potentially enabling a similar cloud view also locally in the low latency radio protocol part of the system. For latency reasons, this execution can be physically near the radio antennas. In some embodiments these are integrated as one physical unit.

By having a distributed application also at the real-time execution in the radio access network node, it is possible to reuse mechanisms from the cloud for software maintenance and lifecycle issues, giving the same manageability. Also, a so-called local cloud view in the radio access network node with distributed independent sub-modules that can fail or restart without bringing the whole radio access network node down will also support a higher availability.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 17:
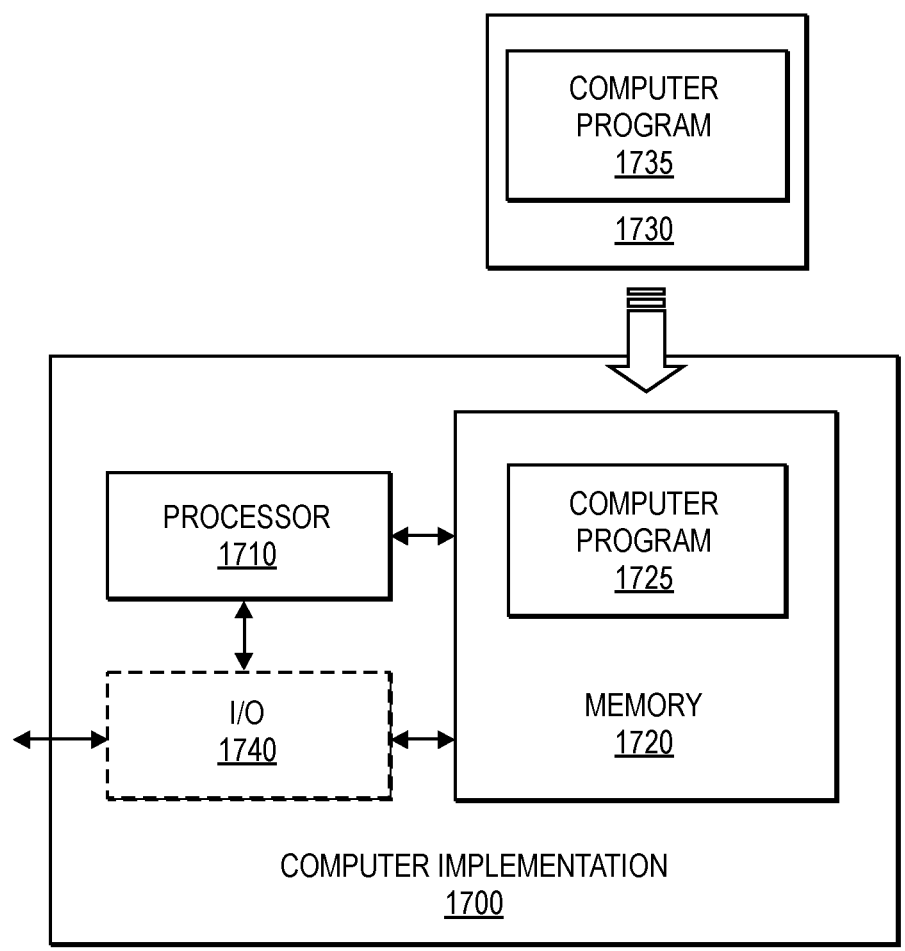
FIG. 17 is a schematic diagram illustrating an example of a computer implementation according to an embodiment.

FIG. 17 is a schematic diagram illustrating an example of a computer implementation 1700 according to an embodiment. In this particular example, at least some of the steps, functions, procedures, modules and/or blocks described herein are implemented in a computer program 1725, 1735, which is loaded into the memory 1720 for execution by processing circuitry including one or more processors 1710. The processor(s) 1710 and memory 1720 are interconnected to each other to enable normal software execution. An optional input/output device 1740 may also be interconnected to the processor(s) 1710 and/or the memory 1720 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' can be interpreted in a general sense as any system or device capable of executing program code or computer program instructions to perform a particular processing, determining or computing task.

The processing circuitry including one or more processors 1710 is thus configured to perform, when executing the computer program 1725, well-defined processing tasks such as those described herein.

In a particular aspect, there is provided a computer program 1725, 1735 for operating, when executed, a radio access network node for a wireless communication system. The radio access network node is implemented as a clustered system comprising a cluster of at least two interconnected network node sub-modules. The computer program 1725, 1735 comprises instructions, which when executed by at least one processor, cause the at least one processor to: enable at least one of the network node sub-modules to manage at least one radio and/or antenna unit, and enable at least one of the network node sub-modules to perform a direct memory write operation into a data structure of at least one other network node sub-module.

By way of example, the computer program 1725, 1735 may be implemented as a distributed application for execution on the cluster of interconnected network node sub-modules.

In another particular aspect, there is provided a computer program 1725, 1735 for operating, when executed, a network node sub-module of a clustered radio access network node comprising a cluster of at least two interconnected network node sub-modules. The computer program 1725, 1735 comprises instructions, which when executed by at least one processor 1710, cause the at least one processor to: enable the network node sub-module to manage at least one radio and/or antenna unit, and enable the network node sub-module to perform a direct memory write operation into a data structure of at least one other network node sub-module.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 1725, 1735 may be realized as a computer program product, which is normally carried or stored on a computer-readable medium 1720, 1730, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
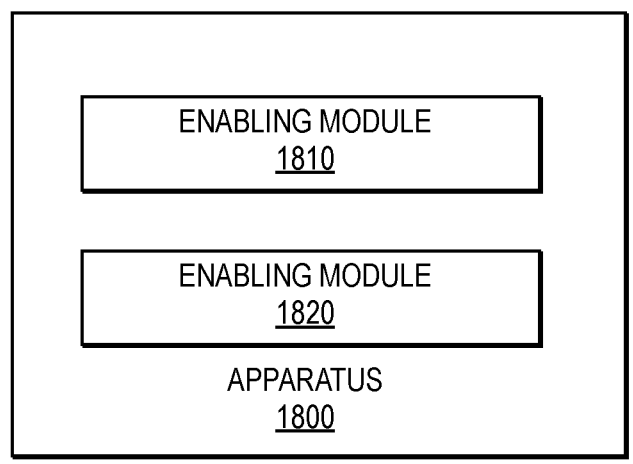
FIG. 18 is a schematic diagram illustrating an example of an apparatus for operating, when executed, a radio access network node and/or a network node sub-module for a wireless communication system.

FIG. 18 is a schematic diagram illustrating an example of an apparatus for operating, when executed, a radio access network node for a wireless communication system. The radio access network node is implemented as a clustered system comprising a cluster of at least two interconnected network node sub-modules. The apparatus 1800 comprises: a module 1810 for enabling at least one of the network node sub-modules to manage at least one radio and/or antenna unit, and a module 1820 for enabling at least one of the network node sub-modules to perform a direct memory write operation into a data structure of at least one other network node sub-module.

With reference once again to FIG. 18, there is also provided an apparatus for operating, when executed, a network node sub-module of a clustered radio access network node comprising a cluster of at least two interconnected network node sub-modules. The apparatus 1800 comprises: a module 1810 for enabling the network node sub-module to manage at least one radio and/or antenna unit, and a module 1820 for enabling the network node submodule to perform a direct memory write operation into a data structure of at least one other network node submodule.

Alternatively, it is possible to realize the module(s) in FIG. 18 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 19:
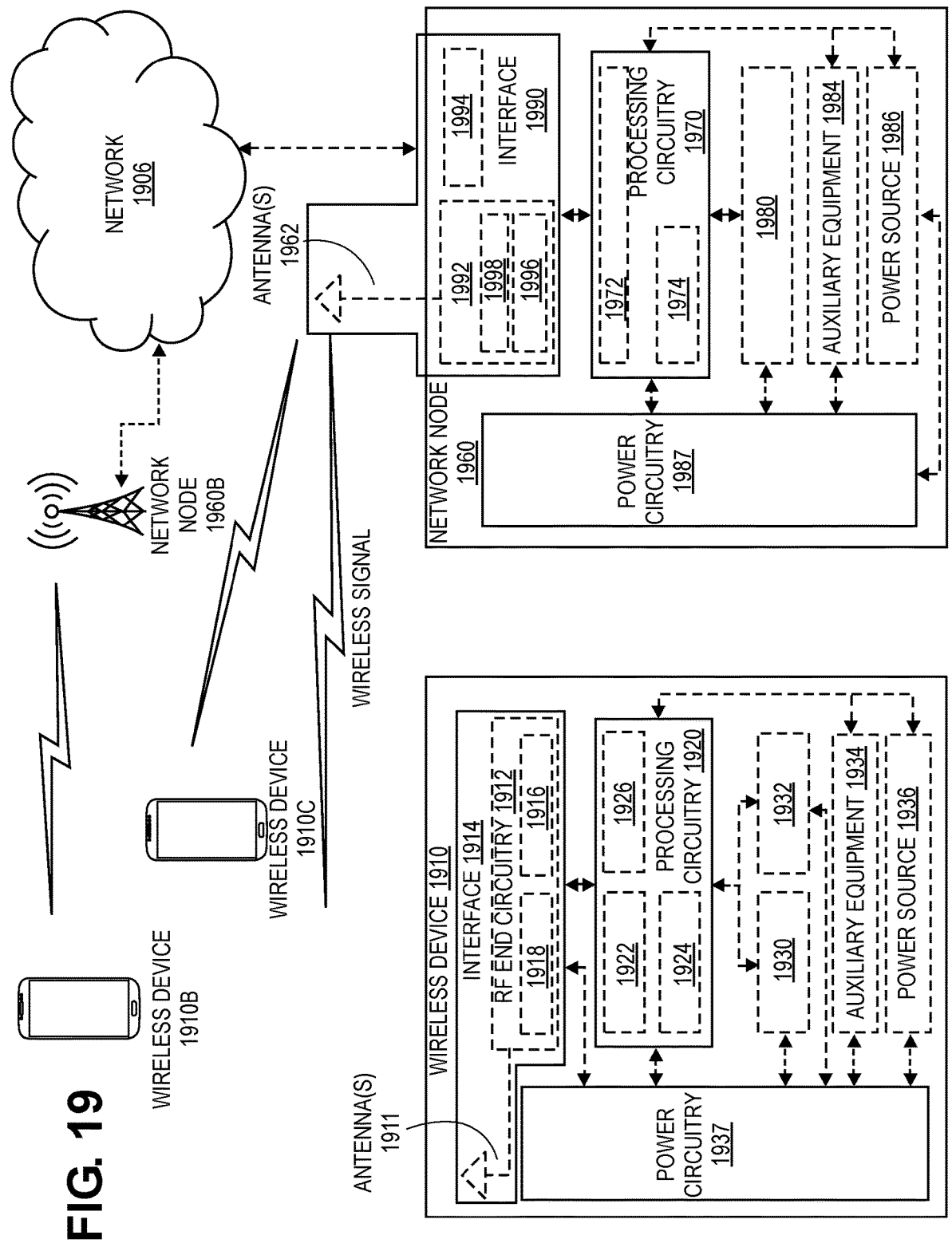
FIG. 19 is a schematic diagram illustrating an example of a wireless network in accordance with some embodiments.

By way of example, the "virtual" apparatus may be implemented in a wireless device or network node (e.g., wireless device 1910 or network node 1960 shown in FIG. 19). The apparatus is operable to carry out the example method(s) described herein, and possibly any other processes or methods disclosed herein. It is also to be understood that at least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of: 1) Consolidation of network functionality into virtualized software running on customized or generic hardware. This is sometimes referred to as network function virtualization. 2) Co-location of one or more application stacks, including operating system, running on separate hardware onto a single hardware platform. This is sometimes referred to as system virtualization, or platform virtualization. 3) Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to provide high performance radio access network nodes such as base stations.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 15-18.

FIG. 19 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960B, and wireless devices 1910, 1910B, and 1910C. In practice, a wireless network may further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LTE, NR, WiFi, or Bluetooth wireless technologies. These wireless technologies may be integrated into the same or different chip or set of chips and other components within network node 1960.

Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source (e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
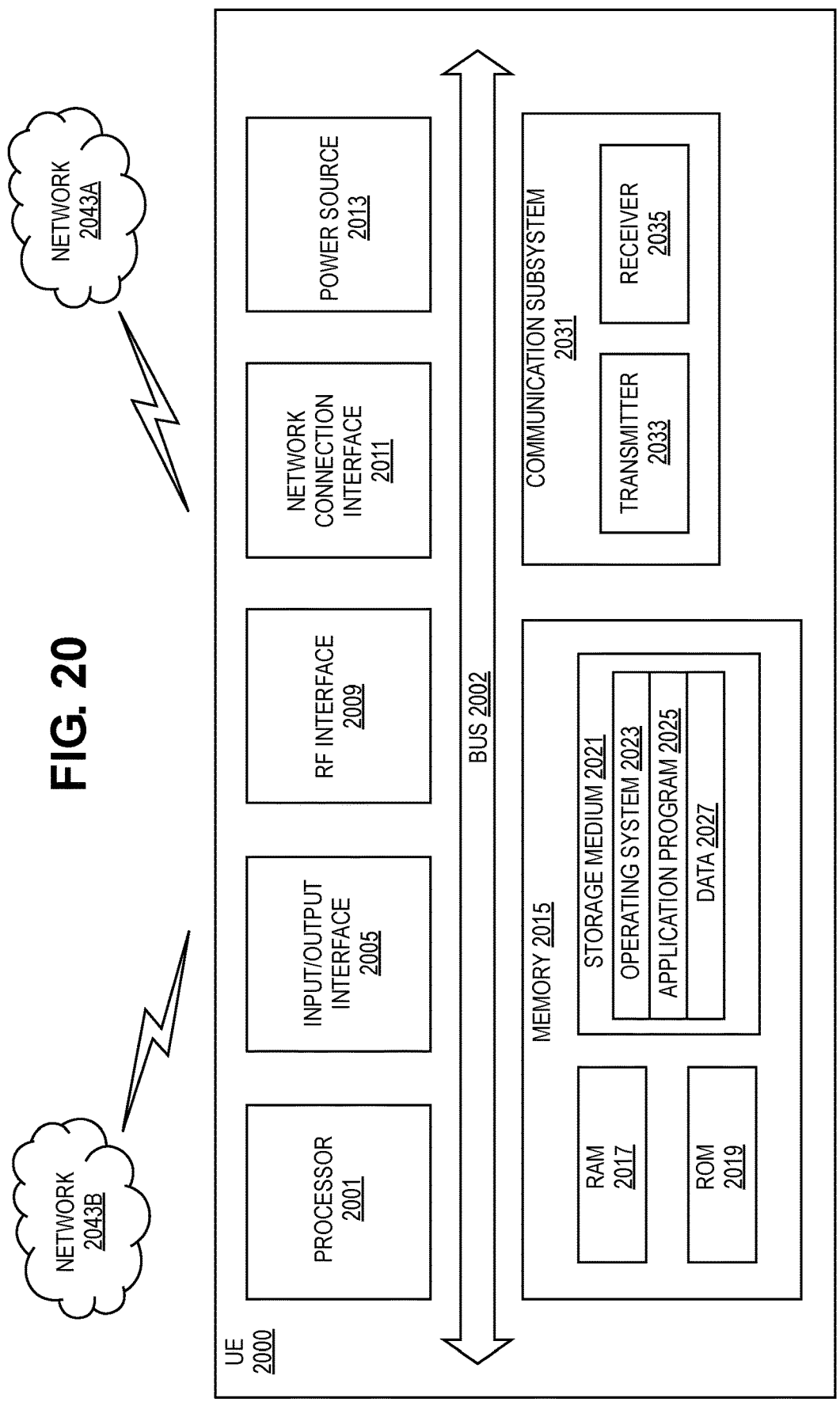
FIG. 20 is a schematic diagram illustrating an example of an embodiment of a UE in accordance with various aspects described herein.

FIG. 20 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processor 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2013, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processor 2001 may be configured to process computer instructions and data. Processor 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processor 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043A. Network 2043A may encompass wired and/or wireless networks such as a local-area network (LAN), a wide-area network (WAN), a computer network, a wireless network, a telecommunications network, another like network or any combination thereof. For example, network 2043A may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processor 2001 to provide storage or caching of data or computer instructions during the execution of software programs such as the operating system, application programs, and device drivers. ROM 2019 may be configured to provide computer instructions or data to processor 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processor 2001 may be configured to communicate with network 2043B using communication subsystem 2031. Network 2043A and network 2043B may be the same network or networks or different network or networks. Communication subsystem 2031 may be configured to include one or more transceivers used to communicate with network 2043B. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043B may encompass wired and/or wireless networks such as a local-area network (LAN), a wide-area network (WAN), a computer network, a wireless network, a telecommunications network, another like network or any combination thereof. For example, network 2043B may be a cellular network, a Wi-Fi network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processor 2001 may be configured to communicate with any of such components over bus 2002. In another example, any of such components may be represented by program instructions stored in memory that when executed by processor 2001 perform the corresponding functions described herein. In another example, the functionality of any of such components may be partitioned between processor 2001 and communication subsystem 2031. In another example, the non-computationally intensive functions of any of such components may be implemented in software or firmware and the computationally intensive functions may be implemented in hardware.

Figure 21:
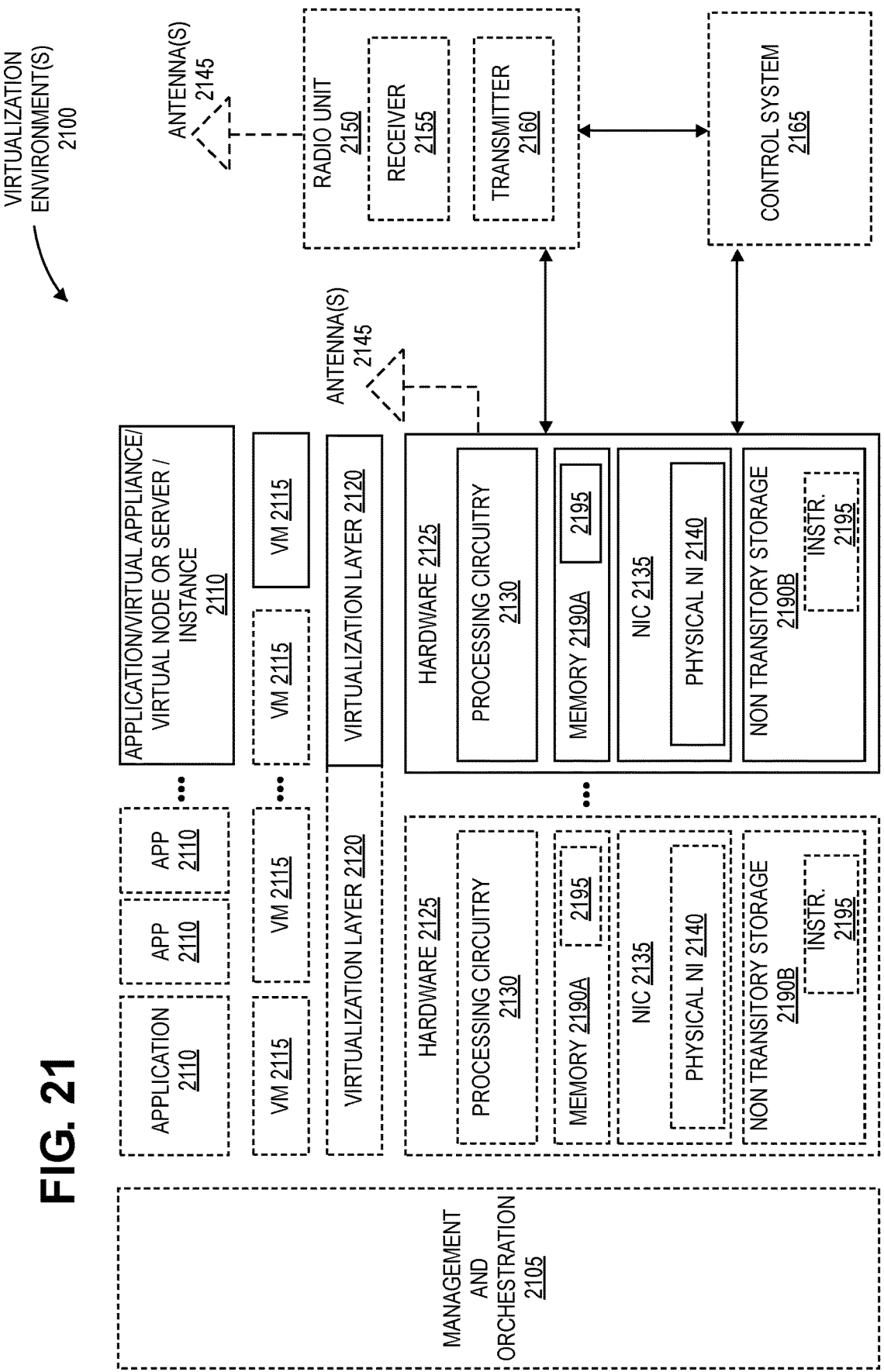
FIG. 21 is a schematic block diagram illustrating an example of a virtualization environment in which functions implemented by some embodiments may be virtualized.

FIG. 21 is a schematic block diagram illustrating an example of a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware 2125. Further, in embodiments in which the virtual node is not a radio access node or does not require radio connectivity (e.g., a core network node), then the network node may be entirely virtualized.

The functions may be implemented by one or more applications 2110 (which may alternatively be called software instances, virtual appliances, network functions, virtual nodes, virtual network functions, etc.) operative to implement some of the features, functions, and/or benefits of some of the embodiments disclosed herein. Applications 2110 are run in virtualization environment 2100 which provides hardware 2125 comprising processing circuitry 2130 and memory 2190A. Memory 2190A contains instructions 2195 executable by processing circuitry 2130 whereby application 2110 is operative to provide one or more of the features, benefits, and/or functions disclosed herein.

Virtualization environment 2100 comprises hardware 2125 comprising a set of one or more processors or processing circuitry 2130, which may be commercial off-the-shelf (COTS) processors, dedicated Application Specific Integrated Circuits (ASICs), or any other type of processing circuitry including digital or analog hardware components or special purpose processors. Each hardware device may comprise memory 2190A which may be non-persistent memory for temporarily storing instructions 2195 or software executed by processing circuitry 2130. Each hardware device may comprise one or more network interface controllers (NICs) 2135, also known as network interface cards, which include physical network interface 2140. Each hardware device may also include non-transitory, persistent, machine-readable storage media 2190B having stored therein software 2195 and/or instructions executable by processing circuitry 2130. Software 2195 may include any type of software including software for instantiating one or more virtualization layers 2120 (also referred to as hypervisors), software to execute virtual machines 2115 as well as software allowing it to execute functions, features and/or benefits described in relation with some embodiments described herein.

Virtual machines 2115, comprise virtual processing, virtual memory, virtual networking or interface and virtual storage, and may be run by a corresponding virtualization layer 2120 or hypervisor. Different embodiments of the instance of virtual appliance 2110 may be implemented on one or more of virtual machines 2115, and the implementations may be made in different ways.

During operation, processing circuitry 2130 executes software 2195 to instantiate the hypervisor or virtualization layer 2120, which may sometimes be referred to as a virtual machine monitor (VMM). Virtualization layer 2120 may present a virtual operating platform that appears like networking hardware to virtual machine 2115.

As shown in FIG. 21, hardware 2125 may be a standalone network node with generic or specific components. Hardware 2125 may comprise antenna 2145 and may implement some functions via virtualization. Alternatively, hardware 2125 may be part of a larger cluster of hardware (e.g. such as in a data center or customer premise equipment (CPE)) where many hardware nodes work together and are managed via management and orchestration (MANO) 2105, which, among others, oversees lifecycle management of applications 2110.

In some embodiments, virtualization of the hardware is in some contexts referred to as NFV. NFV may be used to consolidate many network equipment types onto industry standard high volume server hardware, physical switches, and physical storage, which can be located in data centers, and customer premise equipment. However, NFV is not limited to this usage and can be applied to any function virtualization.

In one example of NFV, virtual machine 2115 may be a software implementation of a physical machine that runs programs as if they were executing on a physical, non-virtualized machine. Each of virtual machines 2115, and that part of hardware 2125 that executes that virtual machine, be it hardware dedicated to that virtual machine and/or hardware shared by that virtual machine with others of the virtual machines 2115, forms a separate virtual network elements (VNE).

Still in the context of NFV, Virtual Network Function (VNF) is responsible for handling specific network functions that run in one or more virtual machines 2115 on top of hardware 2125 and corresponds to application 2110 in FIG. 21.

In some embodiments, one or more radio units 2150 that each include one or more transmitters 2160 and one or more receivers 2155 may be coupled to one or more antennas 2145. Radio units 2150 may communicate directly with hardware 2125 via one or more appropriate network interfaces and may be used in combination with the virtual components to provide a virtual node with radio capabilities, such as a radio access node or a base station.

In some embodiments, some signalling can be effected with the use of control system 2165 which may alternatively be used for communication between the hardware 2125 and radio units 2150.

Figure 22:
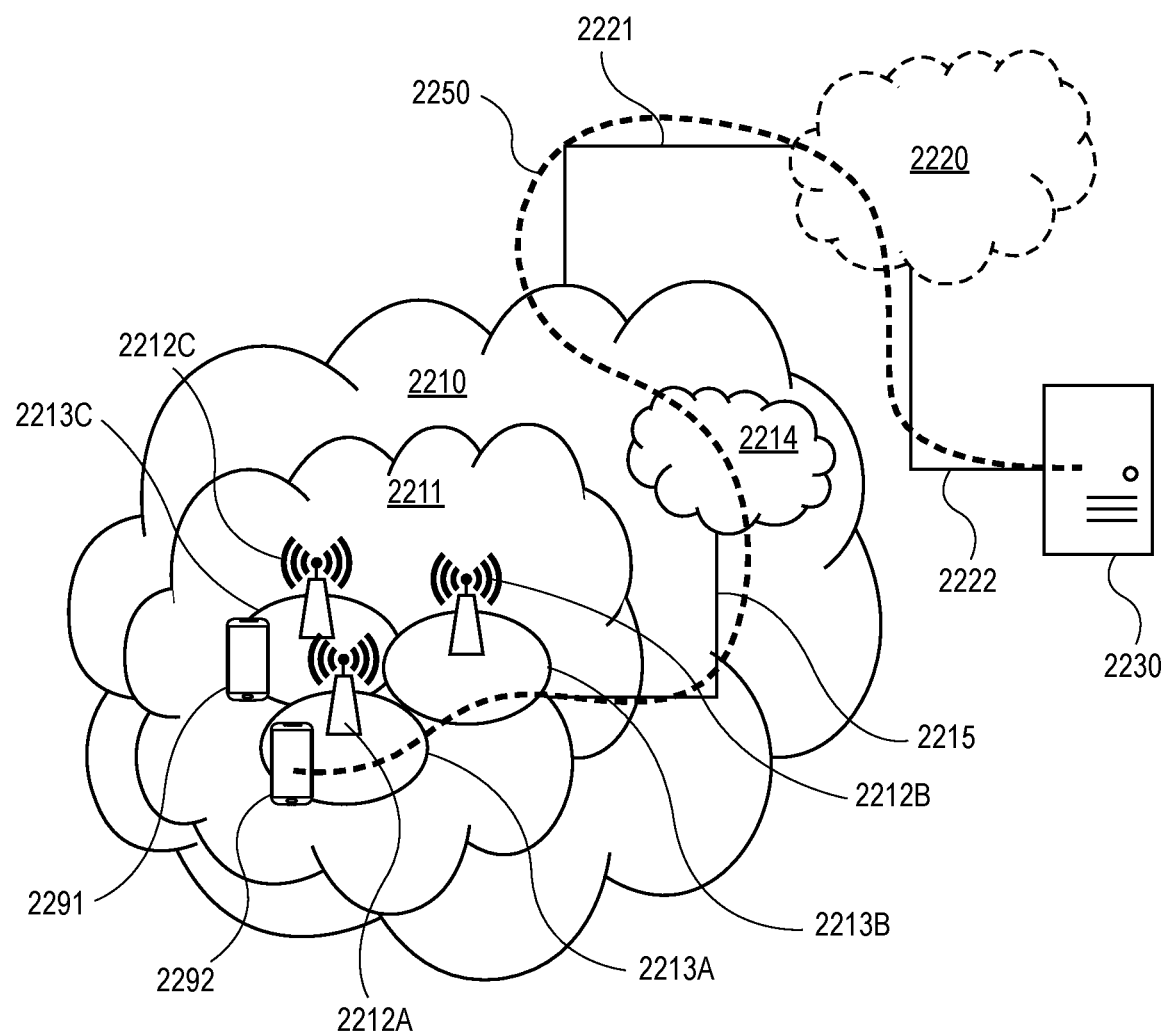
FIG. 22 is a schematic diagram illustrating an example of a telecommunication network connected via an intermediate network to a host computer in accordance with some embodiments.

FIG. 22 is a schematic diagram illustrating an example of a telecommunication network connected via an intermediate network to a host computer in accordance with some embodiments.

With reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212A, 2212B, 2212C, such as NBs, eNBs, gNBs or other types of wireless access points, each defining a corresponding coverage area 2213A-C. Each base station 2212A, 2212B, 2212C is connectable to core network 2214 over a wired or wireless connection 2215. A first UE 2291 located in coverage area 2213C is configured to wirelessly connect to, or be paged by, the corresponding base station 2212C. A second UE 2292 in coverage area 2213A is wirelessly connectable to the corresponding base station 2212A. While a plurality of UEs 2291, 2292 are illustrated in this example, the disclosed embodiments are equally applicable to a situation where a sole UE is in the coverage area or where a sole UE is connecting to the corresponding base station 2212A-C.

Telecommunication network 2210 is itself connected to host computer 2230, which may be embodied in the hardware and/or software of a standalone server, a cloud-implemented server, a distributed server or as processing resources in a server farm. Host computer 2230 may be under the ownership or control of a service provider, or may be operated by the service provider or on behalf of the service provider. Connections 2221 and 2222 between telecommunication network 2210 and host computer 2230 may extend directly from core network 2214 to host computer 2230 or may go via an optional intermediate network 2220. Intermediate network 2220 may be one of, or a combination of more than one of, a public, private or hosted network; intermediate network 2220, if any, may be a backbone network or the Internet; in particular, intermediate network 2220 may comprise two or more sub-networks (not shown).

The communication system of FIG. 22 as a whole enables connectivity between the connected UEs 2291, 2292 and host computer 2230. The connectivity may be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 may be transparent in the sense that the participating communication devices through which OTT connection 2250 passes are unaware of routing of uplink and downlink communications. For example, base station 2212A-C may not or need not be informed about the past routing of an incoming downlink communication with data originating from host computer 2230 to be forwarded (e.g., handed over) to a connected UE 2291. Similarly, base station 2212A-C need not be aware of the future routing of an outgoing uplink communication originating from the UE 2291 towards the host computer 2230.

Figure 23:
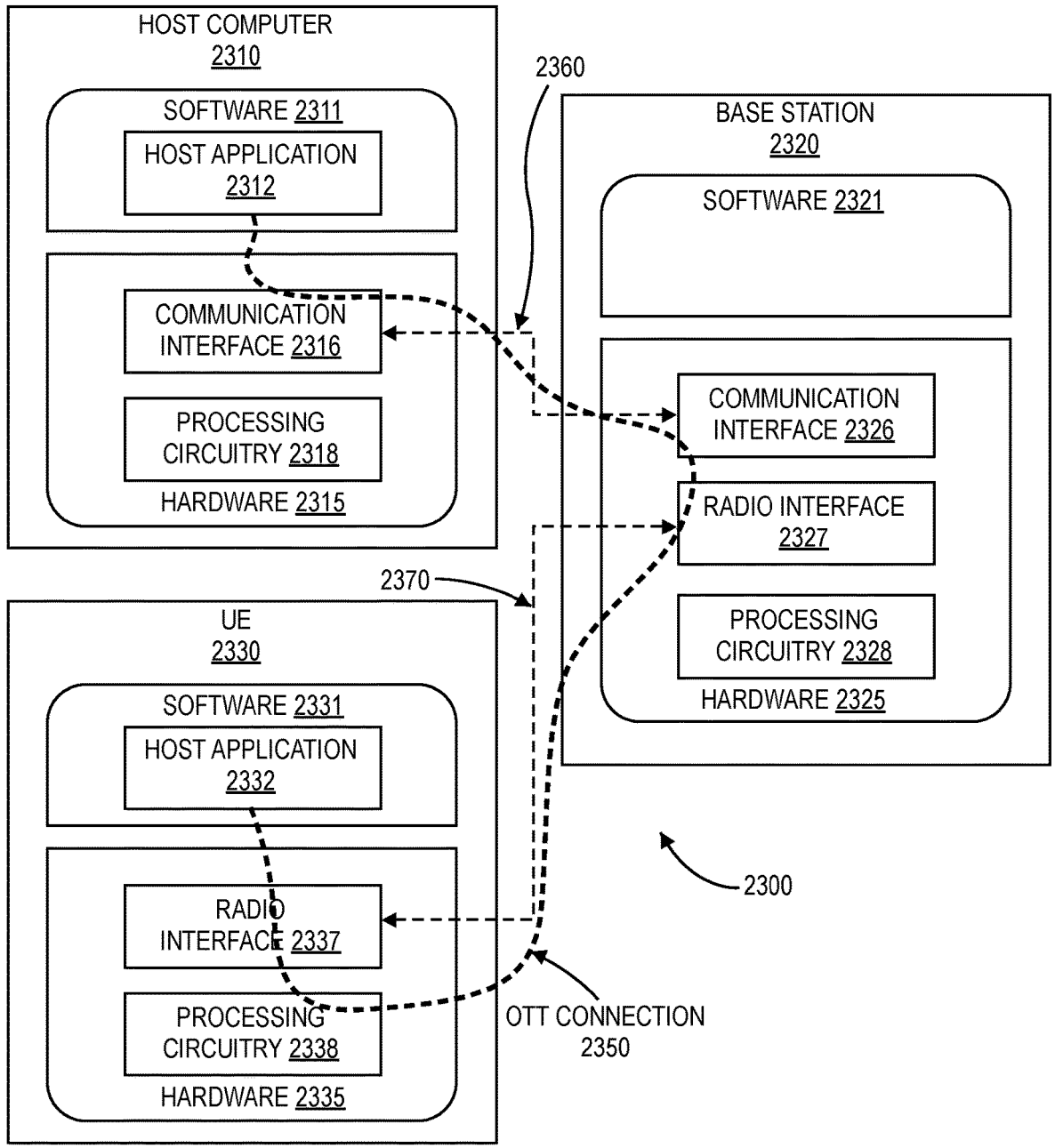
FIG. 23 is a schematic diagram illustrating an example of a host computer communicating via a base station with a user equipment over a partially wireless connection in accordance with some embodiments.

FIG. 23 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 23. In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which may have storage and/or processing capabilities. In particular, processing circuitry 2318 may comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 may be operable to provide a service to a remote user, such as UE 2330 connecting via OTT connection 2350 terminating at UE 2330 and host computer 2310. In providing the service to the remote user, host application 2312 may provide user data which is transmitted using OTT connection 2350.

Communication system 2300 further includes base station 2320 provided in a telecommunication system and comprising hardware 2325 enabling it to communicate with host computer 2310 and with UE 2330. Hardware 2325 may include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 may be configured to facilitate connection 2360 to host computer 2310. Connection 2360 may be direct or it may pass through a core network (not shown in FIG. 23) of the telecommunication system and/or through one or more intermediate networks outside the telecommunication system. In the embodiment shown, hardware 2325 of base station 2320 further includes processing circuitry 2328, which may comprise one or more programmable processors, application-specific integrated circuits, field programmable gate arrays or combinations of these (not shown) adapted to execute instructions. Base station 2320 further has software 2321 stored internally or accessible via an external connection.

Communication system 2300 further includes UE 2330 already referred to. The hardware 2335 may include radio interface 2337 configured to set up and maintain wireless connection 2370 with a base station serving a coverage area in which UE 2330 is currently located. Hardware 2335 of UE 2330 further includes processing circuitry 2338, which may comprise one or more programmable processors, application-specific integrated circuits, field programmable gate arrays or combinations of these (not shown) adapted to execute instructions. UE 2330 further comprises software 2331, which is stored in or accessible by UE 2330 and executable by processing circuitry 2338. Software 2331 includes client application 2332. Client application 2332 may be operable to provide a service to a human or non-human user via UE 2330, with the support of host computer 2310. In host computer 2310, an executing host application 2312 may communicate with the executing client application 2332 via OTT connection 2350 terminating at UE 2330 and host computer 2310. In providing the service to the user, client application 2332 may receive request data from host application 2312 and provide user data in response to the request data. OTT connection 2350 may transfer both the request data and the user data. Client application 2332 may interact with the user to generate the user data that it provides.

It is noted that host computer 2310, base station 2320 and UE 2330 illustrated in FIG. 23 may be similar or identical to host computer 2230, one of base stations 2212A-C and one of UEs 2291, 2292 of FIG. 22, respectively. This is to say, the inner workings of these entities may be as shown in FIG. 23 and independently, the surrounding network topology may be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure may determine the routing, which it may be configured to hide from UE 2330 or from the service provider operating host computer 2310, or both. While OTT connection 2350 is active, the network infrastructure may further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment.

A measurement procedure may be provided for the purpose of monitoring data rate, latency and other factors on which the one or more embodiments improve. There may further be an optional network functionality for reconfiguring OTT connection 2350 between host computer 2310 and UE 2330, in response to variations in the measurement results. The measurement procedure and/or the network functionality for reconfiguring OTT connection 2350 may be implemented in software 2311 and hardware 2315 of host computer 2310 or in software 2331 and hardware 2335 of UE 2330, or both. In embodiments, sensors (not shown) may be deployed in or in association with communication devices through which OTT connection 2350 passes; the sensors may participate in the measurement procedure by supplying values of the monitored quantities exemplified above, or supplying values of other physical quantities from which software 2311, 2331 may compute or estimate the monitored quantities. The reconfiguring of OTT connection 2350 may include message format, retransmission settings, preferred routing etc.; the reconfiguring need not affect base station 2320, and it may be unknown or imperceptible to base station 2320. Such procedures and functionalities may be known and practiced in the art. In certain embodiments, measurements may involve proprietary UE signaling facilitating host computer's 2310 measurements of throughput, propagation times, latency and the like. The measurements may be implemented in that software 2311 and 2331 causes messages to be transmitted, in particular empty or 'dummy' messages, using OTT connection 2350 while it monitors propagation times, errors etc.

Figures 24A, 24B:
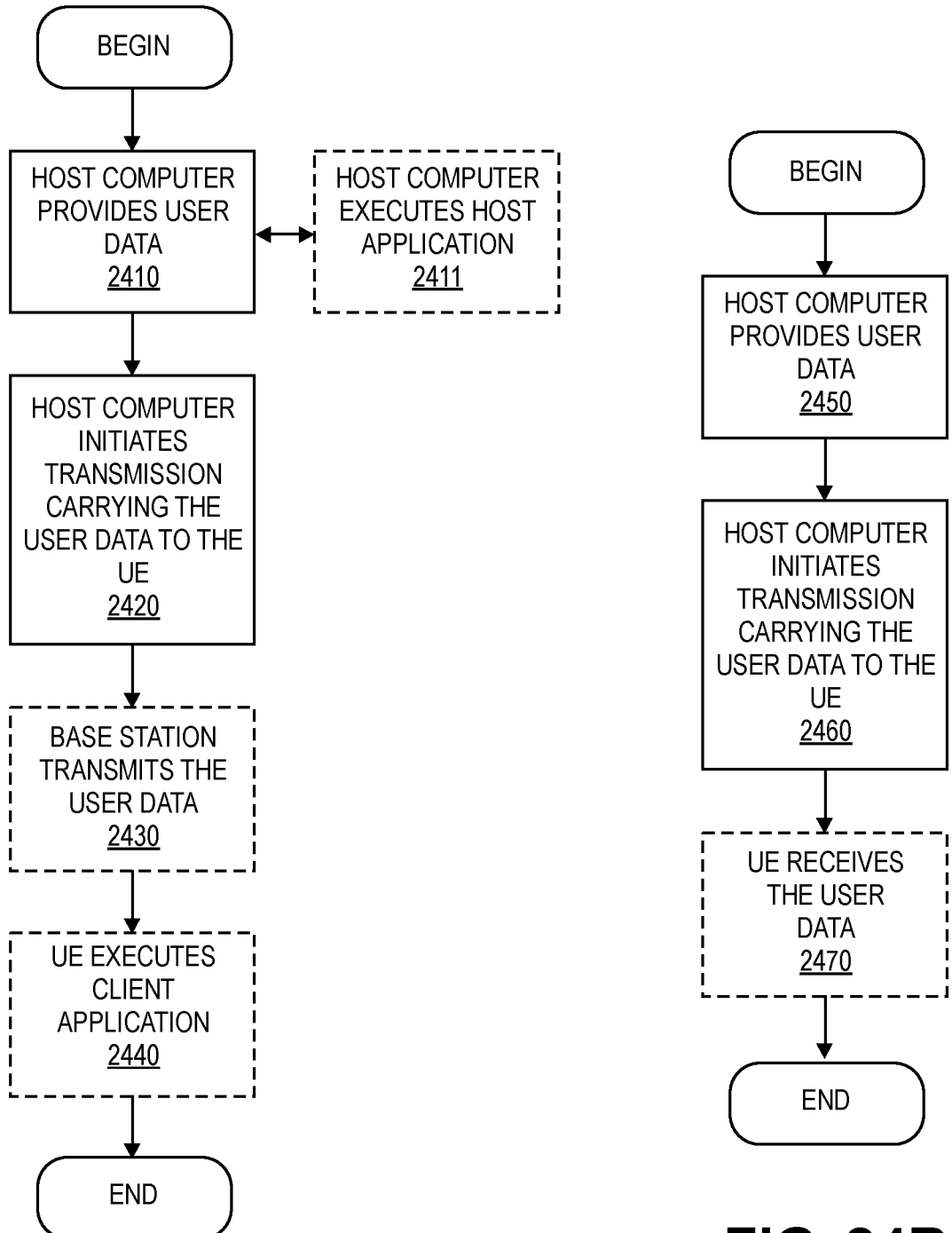
FIGS. 24A-B are schematic flow diagrams illustrating examples of methods implemented in a communication system including, e.g. a host computer, and optionally also a base station and a user equipment in accordance with some embodiments.

FIGS. 24A-B are schematic flow diagrams illustrating examples of methods implemented in a communication system including, e.g. a host computer, and optionally also a base station and a user equipment in accordance with some embodiments.

FIG. 24A is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 24A will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

FIG. 24B is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 24B will be included in this section. In step 2450 of the method, the host computer provides user data. In an optional substep (not shown) the host computer provides the user data by executing a host application. In step 2460, the host computer initiates a transmission carrying the user data to the UE. The transmission may pass via the base station, in accordance with the teachings of the embodiments described throughout this disclosure. In step 2470 (which may be optional), the UE receives the user data carried in the transmission.

Figures 25A, 25B:
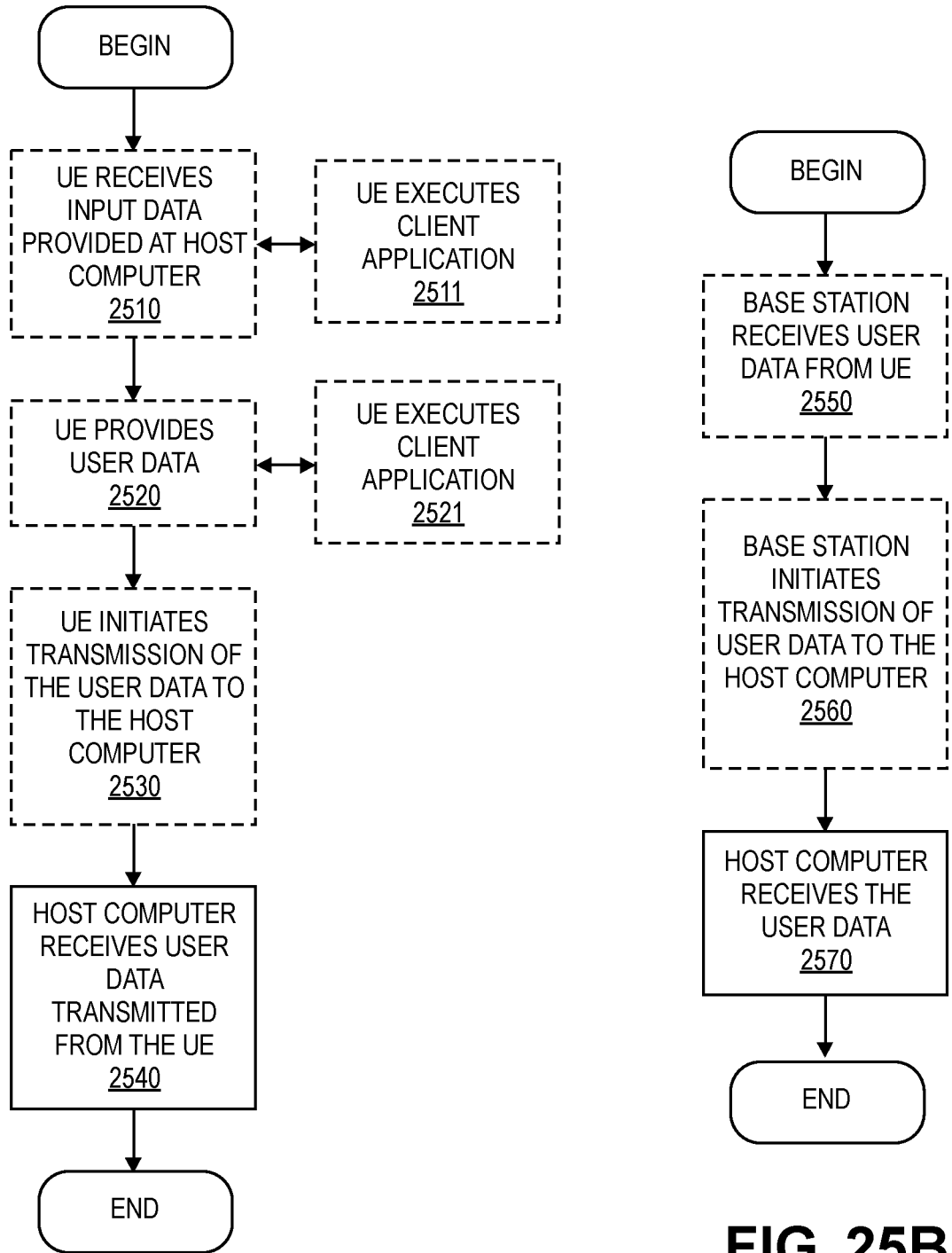
FIGS. 25A-B are schematic diagrams illustrating examples of methods implemented in a communication system including a host computer, a base station and a user equipment in accordance with some embodiments.

FIGS. 25A-B are schematic diagrams illustrating examples of methods implemented in a communication system including a host computer, a base station and a user equipment in accordance with some embodiments.

FIG. 25A is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 25A will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer.

In step 2540 of the method, the host computer receives the user data transmitted from the UE, in accordance with the teachings of the embodiments described throughout this disclosure.

FIG. 25B is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 33B will be included in this section. In step 2550 (which may be optional), in accordance with the teachings of the embodiments described throughout this disclosure, the base station receives user data from the UE. In step 2560 (which may be optional), the base station initiates transmission of the received user data to the host computer. In step 2570 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises: obtaining user data; and forwarding the user data to a host computer or a wireless device.

There is also provided a network node such as a base station comprising processing circuitry configured to perform any of the steps of the method described herein.

There is further provided a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

While embodiments of the invention have been described in relation to a low latency channel, other embodiments are possible where similar processes are utilized. In particular, any process where data is to be disseminated in an ordered fashion to a discrete group can utilize the principles and structures described herein Therefore, embodiments of the invention are not limited to the example low latency channel management. In addition, while embodiments of the invention have been described in relation to low latency channel management, alternative embodiments could be implemented such that an ordered dissemination of information via remote writes is possible. Such an embodiment could be implemented by having the same sender, receiver, and sequencer functions distributed over multiple computing devices.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by an electronic device for sending data on a low latency communication channel, the method comprising:
   determining whether there is an open position in a receive buffer of a receiver using a local tracking mechanism;
   remote writing data of a message to an area of an address space of a sending application that is mapped onto the receive buffer as a result of determining there is the open position in the receive buffer;
   incrementing a local sequence counter; and
   updating position information in the local tracking mechanism.

2. The method of claim 1, wherein the message is written directly to the receive buffer without utilizing an operating system of the receiver, where the receiver is a remote computer executing an application associated with the receive buffer.

3. The method of claim 1, further comprising:
   remote writing a sequence number of the message to be sent next to the receiver.

4. The method of claim 1, wherein the remote writing includes a combination of writes from a local store buffer.

5. The method of claim 1, further comprising:
   flushing a local store buffer after the message is written to the receive buffer.

6. The method of claim 1, wherein an address space of the receiver including the receive buffer is mapped to an address space of the electronic device, the method further comprising:

remote writing a pointer to an address in the receive buffer to the receiver to notify the receiver of the remote writing of the message.

7. An electronic device for sending data on a low latency communication channel comprising:
   a non-transitory computer readable medium having stored therein a channel manager; and
   a processor coupled to the non-transitory computer readable medium, the processor to execute the channel manager to cause the electronic device to:
      determine whether there is an open position in a receive buffer of a receiver using a local tracking mechanism;
      remote write data of a message to an area of an address space of a sending application that is mapped onto the receive buffer as a result of a determination that there is the open position in the receive buffer;
      increment a local sequence counter; and
      update position information in the local tracking mechanism.

8. The electronic device of claim 7, wherein the electronic device is configured to execute a plurality of virtual machines, the plurality of virtual machines implementing network function virtualization (NFV).

9. The electronic device of claim 7, wherein the electronic device is a control plane device configured to implement a control plane of a software defined networking (SDN).

10. The electronic device of claim 7, wherein the electronic device is a base station configured to operate in a radio access network.

11. A method implemented by an electronic device for sending data on a low latency communication channel, the method comprising:
    loading a received message from a receive buffer;
    providing received message to local application;
    updating receive buffer position information in local tracking mechanism; and
    acknowledging the received message by remote write to update a tracking mechanism of a sender of the message.

12. The method of claim 11, further comprising:
    releasing a local store buffer after update of the local tracking mechanism of a sender of the message via the remote write.

13. The method of claim 11, further comprising: determining whether a sequence number for messages has changed, and wherein the loading is responsive to determining the sequence number has changed.

14. The method of claim 11, further comprising:
    verifying a checksum for the received message.

15. The method of claim 11, further comprising:
    incrementing a local sequence counter after providing the received message to the local application.

16. The method of claim 11, further comprising:
    clearing the received message after providing the received message to the local application.

17. An electronic device for sending data on a low latency communication channel comprising:
    a non-transitory computer readable medium having stored therein a channel manager; and
    a processor coupled to the non-transitory computer readable medium, the processor to execute the channel manager to cause the electronic device to:
       load a received message from a receive buffer;
       provide received message to local application;
       update receive buffer position information in local tracking mechanism; and
       acknowledge the received message by remote write to update a tracking mechanism of a sender of the message.

18. The electronic device of claim 17, wherein the electronic device is configured to execute a plurality of virtual machines, the plurality of virtual machines implementing network function virtualization (NFV).

19. The electronic device of claim 17, wherein the electronic device is a control plane device configured to implement a control plane of a software defined networking (SDN).

20. The electronic device of claim 17, wherein the electronic device is a base station configured to operate in a radio access network.

* * * * *